US012497648B2

(12) United States Patent
Dzelil et al.

(10) Patent No.: US 12,497,648 B2
(45) Date of Patent: Dec. 16, 2025

(54) METHODS AND SYSTEMS FOR PROCESSING GENETIC SAMPLES TO DETERMINE IDENTITY OR DETECT CONTAMINATION

(71) Applicant: ABS Global, Inc., DeForest, WI (US)

(72) Inventors: Jennifer Dzelil, Waunakee, WI (US); Matthew Campbell, Waunakee, WI (US); Steve Rounsley, DeForest, WI (US); Patrice Linel, DeForest, WI (US)

(73) Assignee: ABS GLOBAL, INC., Deforest, WI (US)

( * ) Notice: Subject to any disclaimer, the term of this patent is extended or adjusted under 35 U.S.C. 154(b) by 229 days.

(21) Appl. No.: 17/507,662

(22) Filed: Oct. 21, 2021

(65) Prior Publication Data

US 2022/0119865 A1  Apr. 21, 2022

Related U.S. Application Data

(60) Provisional application No. 63/094,750, filed on Oct. 21, 2020.

(51) Int. Cl.
*C12Q 1/6809* (2018.01)
*C12Q 1/686* (2018.01)
*C12Q 1/6869* (2018.01)
*C12Q 1/6876* (2018.01)

(52) U.S. Cl.
CPC ........... *C12Q 1/6809* (2013.01); *C12Q 1/686* (2013.01); *C12Q 1/6869* (2013.01); *C12Q 1/6876* (2013.01)

(58) Field of Classification Search
CPC .... C12Q 1/6809; C12Q 1/686; C12Q 1/6869; C12Q 1/6876
See application file for complete search history.

(56) References Cited

U.S. PATENT DOCUMENTS

| | | |
|---|---|---|
| 1,119,387 A | 12/1914 | Baker |
| 3,390,449 A | 7/1968 | Fox |
| 3,649,829 A | 3/1972 | Randolph |
| 3,661,460 A | 5/1972 | Elking et al. |
| 3,710,933 A | 1/1973 | Fulwyler et al. |
| 3,764,901 A | 10/1973 | Kachel |
| 3,791,517 A | 2/1974 | Friedman |
| 4,175,662 A | 11/1979 | Zold |
| 4,325,706 A | 4/1982 | Gershman et al. |
| 4,395,397 A | 7/1983 | Shapiro |
| 4,409,106 A | 10/1983 | Furuta et al. |
| 4,424,132 A | 1/1984 | Iriguchi |
| 4,660,971 A | 4/1987 | Sage et al. |
| 4,667,830 A | 5/1987 | Nozaki, Jr. et al. |
| 4,765,737 A | 8/1988 | Harris et al. |
| 4,885,473 A | 12/1989 | Shofner et al. |
| 4,919,817 A | 4/1990 | Schoendorfer et al. |
| 4,983,038 A | 1/1991 | Ohki et al. |
| 5,007,732 A | 4/1991 | Ohki et al. |
| 5,030,002 A | 7/1991 | North, Jr. |
| 5,100,627 A | 3/1992 | Buican et al. |
| 5,125,749 A | 6/1992 | Leugers et al. |
| 5,135,759 A | 8/1992 | Johnson |
| 5,180,065 A | 1/1993 | Touge et al. |
| 5,194,909 A | 3/1993 | Tycko |
| 5,229,297 A | 7/1993 | Schnipelsky et al. |
| 5,483,469 A | 1/1996 | Van den Engh et al. |
| 5,491,550 A | 2/1996 | Dabbs |
| 5,620,857 A | 4/1997 | Weetall et al. |
| 5,674,743 A | 10/1997 | Ulmer |
| 5,689,109 A | 11/1997 | Schütze |
| 5,752,606 A | 5/1998 | Wilson et al. |
| 5,800,690 A | 9/1998 | Chow et al. |
| 5,837,115 A | 11/1998 | Austin et al. |
| 5,849,178 A | 12/1998 | Holm et al. |
| 5,858,187 A | 1/1999 | Ramsey et al. |
| 5,879,625 A | 3/1999 | Rosianiec et al. |
| 5,966,457 A | 10/1999 | Lemelson |
| 5,976,885 A | 11/1999 | Cohenford |
| 5,985,216 A | 11/1999 | Rens et al. |
| 6,008,010 A | 12/1999 | Greenberger et al. |
| 6,053,856 A | 4/2000 | Hlavinka |
| 6,071,442 A | 6/2000 | Dean et al. |
| 6,146,897 A | 11/2000 | Cohenford et al. |
| 6,159,739 A | 12/2000 | Weigl et al. |

(Continued)

FOREIGN PATENT DOCUMENTS

| | | |
|---|---|---|
| CA | 1341328 C | 12/2001 |
| CN | 2125369 U | 12/1992 |

(Continued)

OTHER PUBLICATIONS

McClure et al.,SNP Data Quality Control in a National Beef and Dairy Cattle System and Highly Accurate SNP Based Parentage Verification and Front Genet.(2018) 15;9:84. doi: 10.3389/fgene. 2018.00084 (Year: 2018).*

A. Colley, M. Buhr, S.P. Golovan, Single bovine sperm sex typing by amelogenin nested PCR, Theriogenology, vol. 70, Issue 6, 2008, pp. 978-983, ISSN 0093-691X, (Year: 2008).*

Illumina, Highlights of. "Multiplexed Sequencing with the Illumina Genome Analyzer System." (2018). (Year: 2018).*

AgriSeq HTS Library Kit User Guide, Pub No. MAN0015971 D.0 (Year: 2017).*

Colley et al., "Single bovine sperm sex typing by amelogenin nested PCR"; Theriogenology (2008), vol. 70, Issue 6, pp. 978-983,ISSN 0093-691X (Year: 2008).*

(Continued)

*Primary Examiner* — Aaron A Priest
*Assistant Examiner* — Tian Yu
(74) *Attorney, Agent, or Firm* — NGUYEN TARBET IP LAW

(57) ABSTRACT

Methods and systems for processing semen samples from straws for determining genetic identity, testing the purity of the sample, detecting errors or contamination, calculating an amount of contamination, and determining the identity of the contaminant. The methods herein can detect low levels of contamination, such as contamination of about 0.5%, 1%, 2%, etc.

19 Claims, 4 Drawing Sheets

Specification includes a Sequence Listing.

(56) References Cited

U.S. PATENT DOCUMENTS

| | | |
|---|---|---|
| 6,159,749 A | 12/2000 | Liu |
| 6,171,865 B1 | 1/2001 | Weigl et al. |
| 6,185,664 B1 | 2/2001 | Jeddeloh |
| 6,213,151 B1 | 4/2001 | Jacobson et al. |
| H1960 H | 6/2001 | Conrad et al. |
| 6,368,871 B1 | 4/2002 | Christel et al. |
| 6,416,190 B1 | 7/2002 | Grier et al. |
| 6,416,959 B1 | 7/2002 | Giuliano et al. |
| 6,432,630 B1 | 8/2002 | Blankenstein |
| 6,451,264 B1 | 9/2002 | Bhullar et al. |
| 6,473,171 B1 | 10/2002 | Buttry et al. |
| 6,494,230 B2 | 12/2002 | Chow |
| 6,506,609 B1 | 1/2003 | Wada |
| 6,519,032 B1 | 2/2003 | Kuebler et al. |
| 6,519,954 B1 | 2/2003 | Prien et al. |
| 6,524,860 B1 | 2/2003 | Seidel et al. |
| 6,540,895 B1 | 4/2003 | Spence et al. |
| 6,549,275 B1 | 4/2003 | Cabuz et al. |
| 6,592,821 B1 | 7/2003 | Wada et al. |
| 6,637,463 B1 | 10/2003 | Lei et al. |
| 6,674,525 B2 | 1/2004 | Bardell et al. |
| 6,727,451 B1 | 4/2004 | Fuhr et al. |
| 6,808,075 B2 | 10/2004 | Böhm et al. |
| 6,833,542 B2 | 12/2004 | Wang et al. |
| 6,838,056 B2 | 1/2005 | Foster |
| 6,841,388 B2 | 1/2005 | Dukor et al. |
| 6,853,654 B2 | 2/2005 | Mcdonald et al. |
| 6,877,528 B2 | 4/2005 | Gilbert et al. |
| 6,944,324 B2 | 9/2005 | Tran et al. |
| 6,976,590 B2 | 12/2005 | Deshpande et al. |
| 7,029,430 B2 | 4/2006 | Hlavinka et al. |
| 7,069,943 B2 | 7/2006 | Gilbert et al. |
| 7,092,154 B2 | 8/2006 | Yasuda et al. |
| 7,104,405 B2 | 9/2006 | Böhm et al. |
| 7,195,920 B2 | 3/2007 | Seidel et al. |
| 7,208,265 B1 | 4/2007 | Schenk |
| 7,241,988 B2 | 7/2007 | Gruber et al. |
| 7,276,701 B2 | 10/2007 | Lendl |
| 7,298,478 B2 | 11/2007 | Gilbert et al. |
| 7,300,803 B2 | 11/2007 | Lin et al. |
| 7,311,476 B2 | 12/2007 | Gilbert et al. |
| 7,312,085 B2 | 12/2007 | Chou et al. |
| 7,355,696 B2 | 4/2008 | Mueth et al. |
| 7,355,699 B2 | 4/2008 | Gilbert et al. |
| 7,466,734 B1 | 12/2008 | Day et al. |
| 7,472,794 B2 | 1/2009 | Oakey et al. |
| 7,482,577 B2 | 1/2009 | Gruber et al. |
| 7,492,522 B2 | 2/2009 | Gilbert et al. |
| 7,524,681 B2 | 4/2009 | Wolf et al. |
| 7,569,788 B2 | 8/2009 | Deshpande et al. |
| 7,576,861 B2 | 8/2009 | Gilbert et al. |
| 7,584,857 B2 | 9/2009 | Böhm et al. |
| 7,611,309 B2 | 11/2009 | Gilbert et al. |
| 7,670,471 B2 | 3/2010 | Quake et al. |
| 7,697,576 B2 | 4/2010 | Maier et al. |
| 7,758,811 B2 | 7/2010 | Durack et al. |
| 7,760,351 B2 | 7/2010 | Cox et al. |
| 7,820,425 B2 | 10/2010 | Schenk |
| 7,826,509 B2 | 11/2010 | Belkin et al. |
| 7,956,328 B2 | 6/2011 | Sundaram et al. |
| 7,963,399 B2 | 6/2011 | Böhm et al. |
| 7,997,831 B2 | 8/2011 | Gilbert et al. |
| 8,032,200 B2 | 10/2011 | Tearney et al. |
| 8,080,422 B2 | 12/2011 | Neas et al. |
| 8,123,044 B2 | 2/2012 | Johnson et al. |
| 8,149,402 B2 | 4/2012 | Rich |
| 8,158,122 B2 | 4/2012 | Hampson et al. |
| 8,173,001 B2 | 5/2012 | Quake et al. |
| 8,174,394 B2 | 5/2012 | Ridder et al. |
| 8,198,092 B2 | 6/2012 | Durack et al. |
| 8,206,987 B2 | 6/2012 | Durack et al. |
| 8,209,987 B2 | 7/2012 | Hautman et al. |
| 8,210,209 B2 | 7/2012 | Gilbert et al. |
| 8,277,764 B2 | 10/2012 | Gilbert et al. |
| 8,388,822 B2 | 3/2013 | Quake et al. |
| 8,408,399 B2 | 4/2013 | Böhm et al. |
| 8,502,148 B2 | 8/2013 | Wagner et al. |
| 8,529,161 B2 | 9/2013 | Gilbert et al. |
| 8,563,325 B1 | 10/2013 | Bartsch et al. |
| 8,567,608 B2 | 10/2013 | Deshpande et al. |
| 8,569,069 B2 | 10/2013 | Durack |
| 8,623,295 B2 | 1/2014 | Gilbert et al. |
| 8,727,131 B2 | 5/2014 | Deshpande et al. |
| 8,731,860 B2 | 5/2014 | Charles et al. |
| 8,863,962 B2 | 10/2014 | Johnson et al. |
| 8,941,062 B2 | 1/2015 | Wagner et al. |
| 8,961,904 B2 | 2/2015 | Xia et al. |
| 8,964,184 B2 | 2/2015 | Gilbert et al. |
| 8,981,298 B2 | 3/2015 | Wagner et al. |
| 9,000,357 B2 | 4/2015 | Mueth et al. |
| 9,003,869 B2 | 4/2015 | Wagner et al. |
| 9,011,797 B2 | 4/2015 | Gilbert et al. |
| 9,109,195 B2 | 8/2015 | Zimmermann et al. |
| 9,140,690 B2 | 9/2015 | Mueth et al. |
| 9,255,874 B2 | 2/2016 | Sharpe et al. |
| 9,260,693 B2 | 2/2016 | Johnson et al. |
| 9,335,247 B2 | 5/2016 | Sharpe et al. |
| 9,335,295 B2 | 5/2016 | Mueth et al. |
| 9,339,850 B2 | 5/2016 | Deshpande et al. |
| 9,365,822 B2 | 6/2016 | Seidel et al. |
| 9,377,400 B2 | 6/2016 | Wagner et al. |
| 9,446,912 B2 | 9/2016 | Gilbert et al. |
| 9,485,984 B2 | 11/2016 | Burbank et al. |
| 9,550,215 B2 | 1/2017 | Deshpande et al. |
| 9,588,100 B2 | 3/2017 | Appleyard et al. |
| 9,618,442 B2 | 4/2017 | Sharpe et al. |
| 9,683,922 B2 | 6/2017 | Wagner et al. |
| D791,338 S | 7/2017 | Morkos et al. |
| 9,752,976 B2 | 9/2017 | Gilbert et al. |
| 9,781,918 B2 | 10/2017 | Zimmermann et al. |
| 9,802,767 B2 | 10/2017 | Gilbert et al. |
| 9,823,252 B2 | 11/2017 | Gilbert et al. |
| 9,835,552 B2 | 12/2017 | Wagner |
| D815,754 S | 4/2018 | Morkos et al. |
| 9,943,847 B2 | 4/2018 | Gilbert et al. |
| 9,964,968 B2 | 5/2018 | Sharpe et al. |
| 10,025,322 B2 | 7/2018 | Lofstrom et al. |
| 10,029,283 B2 | 7/2018 | Deshpande et al. |
| 10,175,159 B2 | 1/2019 | Wagner et al. |
| 10,180,388 B2 | 1/2019 | Wagner |
| 10,216,144 B2 | 2/2019 | Mueth et al. |
| 10,315,194 B2 | 6/2019 | Akiyama et al. |
| 11,187,224 B2 | 11/2021 | Xia et al. |
| 11,243,494 B2 | 2/2022 | Mueth et al. |
| 2002/0005354 A1 | 1/2002 | Spence et al. |
| 2002/0027649 A1 | 3/2002 | Chudner |
| 2002/0042042 A1 | 4/2002 | Fahy |
| 2002/0058332 A1 | 5/2002 | Quake et al. |
| 2002/0106716 A1 | 8/2002 | Leboeuf et al. |
| 2002/0115208 A1 | 8/2002 | Mitchell et al. |
| 2002/0176069 A1 | 11/2002 | Hansen et al. |
| 2002/0198928 A1 | 12/2002 | Bukshpan et al. |
| 2003/0007894 A1 | 1/2003 | Wang et al. |
| 2003/0032204 A1 | 2/2003 | Walt et al. |
| 2003/0044832 A1 | 3/2003 | Blankenstein |
| 2003/0047676 A1 | 3/2003 | Grier et al. |
| 2003/0054365 A1 | 3/2003 | Xu et al. |
| 2003/0054558 A1 | 3/2003 | Kurabayashi et al. |
| 2003/0068646 A1 | 4/2003 | Singh et al. |
| 2003/0113709 A1 | 6/2003 | Alivisatos et al. |
| 2003/0175944 A1 | 9/2003 | Yang et al. |
| 2003/0175980 A1 | 9/2003 | Hayenga et al. |
| 2003/0186426 A1 | 10/2003 | Brewer et al. |
| 2004/0043506 A1 | 3/2004 | Haussecker et al. |
| 2004/0079893 A1 | 4/2004 | Dietz et al. |
| 2004/0089798 A1 | 5/2004 | Gruber et al. |
| 2004/0144648 A1 | 7/2004 | Jacobson et al. |
| 2004/0161772 A1 | 8/2004 | Bohm et al. |
| 2004/0166504 A1 | 8/2004 | Rossier et al. |
| 2004/0206399 A1 | 10/2004 | Heller et al. |
| 2004/0217297 A1 | 11/2004 | Moses et al. |
| 2004/0229349 A1 | 11/2004 | Daridon |
| 2004/0266022 A1 | 12/2004 | Sundararajan et al. |
| 2005/0037471 A1 | 2/2005 | Liu et al. |

(56) References Cited

U.S. PATENT DOCUMENTS

| | | |
|---|---|---|
| 2005/0061962 A1 | 3/2005 | Mueth et al. |
| 2005/0103690 A1 | 5/2005 | Kawano et al. |
| 2005/0112541 A1 | 5/2005 | Durack et al. |
| 2005/0121604 A1 | 6/2005 | Mueth et al. |
| 2005/0123450 A1 | 6/2005 | Gilbert et al. |
| 2005/0124869 A1 | 6/2005 | Hefti et al. |
| 2005/0148085 A1 | 7/2005 | Larsen |
| 2005/0153354 A1 | 7/2005 | Gilmanshin |
| 2005/0190372 A1 | 9/2005 | Dogariu |
| 2005/0196876 A1 | 9/2005 | Chan et al. |
| 2005/0207940 A1 | 9/2005 | Butler et al. |
| 2005/0207943 A1 | 9/2005 | Puzey |
| 2006/0013270 A1 | 1/2006 | Yumoto et al. |
| 2006/0035273 A1 | 2/2006 | Quake et al. |
| 2006/0043301 A1 | 3/2006 | Mantele et al. |
| 2006/0058167 A1 | 3/2006 | Ragusa et al. |
| 2006/0078888 A1 | 4/2006 | Griffiths et al. |
| 2006/0105453 A1 | 5/2006 | Brenan et al. |
| 2006/0152707 A1 | 7/2006 | Kanda |
| 2006/0170912 A1 | 8/2006 | Mueth et al. |
| 2006/0252047 A1 | 11/2006 | Ekstrom et al. |
| 2006/0257089 A1 | 11/2006 | Mueth et al. |
| 2006/0263829 A1 | 11/2006 | Evans et al. |
| 2007/0009386 A1 | 1/2007 | Padmanabhan et al. |
| 2007/0078348 A1 | 4/2007 | Holman |
| 2007/0114172 A1 | 5/2007 | Mueth et al. |
| 2007/0128082 A1 | 6/2007 | Yang et al. |
| 2007/0207551 A1 | 9/2007 | Glensbjerg |
| 2007/0247620 A1 | 10/2007 | Koo |
| 2007/0248958 A1 | 10/2007 | Jovanovich et al. |
| 2007/0255362 A1 | 11/2007 | Levinson |
| 2008/0003685 A1 | 1/2008 | Goix et al. |
| 2008/0014574 A1 | 1/2008 | Viator et al. |
| 2008/0021674 A1 | 1/2008 | Puskas |
| 2008/0069733 A1 | 3/2008 | Maltezo et al. |
| 2008/0144037 A1 | 6/2008 | Mueth et al. |
| 2008/0166188 A1 | 7/2008 | Gilbert et al. |
| 2008/0195020 A1 | 8/2008 | Cabuz et al. |
| 2008/0213821 A1 | 9/2008 | Liu et al. |
| 2008/0248966 A1 | 10/2008 | Hansen et al. |
| 2008/0261295 A1 | 10/2008 | Butler et al. |
| 2008/0292555 A1 | 11/2008 | Ye et al. |
| 2008/0299013 A1 | 12/2008 | Trieu et al. |
| 2008/0309919 A1 | 12/2008 | Birmingham et al. |
| 2008/0311005 A1 | 12/2008 | Kim et al. |
| 2009/0004652 A1 | 1/2009 | Rubin et al. |
| 2009/0029870 A1 | 1/2009 | Ward et al. |
| 2009/0032449 A1 | 2/2009 | Mueth et al. |
| 2009/0042241 A1 | 2/2009 | Yu-Chong et al. |
| 2009/0051912 A1 | 2/2009 | Salazar et al. |
| 2009/0114285 A1 | 5/2009 | Hashimoto et al. |
| 2009/0125242 A1 | 5/2009 | Choi et al. |
| 2009/0141279 A1 | 6/2009 | Hillmer |
| 2009/0156932 A1 | 6/2009 | Zharov |
| 2009/0170149 A1 | 7/2009 | Viator et al. |
| 2009/0176271 A1 | 7/2009 | Durack et al. |
| 2009/0201504 A1 | 8/2009 | Ho et al. |
| 2009/0225319 A1 | 9/2009 | Lee et al. |
| 2009/0281250 A1 | 11/2009 | DeSimone et al. |
| 2009/0290156 A1 | 11/2009 | Popescu et al. |
| 2010/0044570 A1 | 2/2010 | McGill et al. |
| 2010/0068723 A1 | 3/2010 | Jovanovich et al. |
| 2010/0079516 A1 | 4/2010 | Nakazawa |
| 2010/0167336 A1 | 7/2010 | Son et al. |
| 2010/0171954 A1 | 7/2010 | Quake et al. |
| 2010/0216208 A1 | 8/2010 | Mueth et al. |
| 2010/0248362 A1 | 9/2010 | Durack et al. |
| 2010/0330693 A1 | 12/2010 | Chapin et al. |
| 2011/0001963 A1 | 1/2011 | Durack |
| 2011/0003303 A1 | 1/2011 | Pagano et al. |
| 2011/0003324 A1 | 1/2011 | Durack |
| 2011/0003325 A1 | 1/2011 | Durack |
| 2011/0003330 A1 | 1/2011 | Durack |
| 2011/0008764 A1 | 1/2011 | Silva et al. |
| 2011/0008767 A1 | 1/2011 | Durack |
| 2011/0008817 A1 | 1/2011 | Durack |
| 2011/0008818 A1 | 1/2011 | Durack |
| 2011/0075928 A1 | 3/2011 | Jeong et al. |
| 2011/0076712 A1 | 3/2011 | Gilligan et al. |
| 2011/0090500 A1 | 4/2011 | Hu et al. |
| 2011/0096327 A1 | 4/2011 | Papautsky et al. |
| 2011/0190146 A1 | 8/2011 | Boehm et al. |
| 2011/0223654 A1 | 9/2011 | Holman et al. |
| 2011/0256523 A1 | 10/2011 | Mendele et al. |
| 2011/0263747 A1 | 10/2011 | Doyle et al. |
| 2011/0294139 A1 | 12/2011 | Takeda |
| 2012/0009619 A1 | 1/2012 | Gilbert et al. |
| 2012/0028366 A1 | 2/2012 | Krager et al. |
| 2012/0033220 A1 | 2/2012 | Kotidis et al. |
| 2012/0033697 A1 | 2/2012 | Goyal et al. |
| 2012/0081709 A1 | 4/2012 | Durack |
| 2012/0082362 A1 | 4/2012 | Diem et al. |
| 2012/0107805 A1 | 5/2012 | Neas et al. |
| 2012/0122084 A1 | 5/2012 | Wagner et al. |
| 2012/0138152 A1 | 6/2012 | Villarruel et al. |
| 2012/0183947 A1 | 7/2012 | Mueth et al. |
| 2012/0196356 A1 | 8/2012 | Wagner et al. |
| 2012/0199741 A1 | 8/2012 | Wagner et al. |
| 2012/0199742 A1 | 8/2012 | Wagner et al. |
| 2012/0202237 A1 | 8/2012 | Sedoglavich et al. |
| 2012/0202277 A1 | 8/2012 | Wagner et al. |
| 2012/0202278 A1 | 8/2012 | Wagner et al. |
| 2012/0204628 A1 | 8/2012 | Wagner et al. |
| 2012/0225474 A1 | 9/2012 | Wagner et al. |
| 2012/0225475 A1 | 9/2012 | Wagner et al. |
| 2012/0273054 A1 | 11/2012 | Lou et al. |
| 2012/0287419 A1 | 11/2012 | Sharpe et al. |
| 2012/0295263 A1 | 11/2012 | Cantor et al. |
| 2012/0307244 A1 | 12/2012 | Sharpe et al. |
| 2013/0121877 A1 | 5/2013 | Ono |
| 2013/0164731 A1 | 6/2013 | Cimino et al. |
| 2013/0164773 A1 | 6/2013 | Bardell et al. |
| 2013/0200277 A1 | 8/2013 | Li et al. |
| 2013/0224843 A1 | 8/2013 | Evans et al. |
| 2013/0252237 A1 | 9/2013 | Wagner |
| 2013/0295602 A1 | 11/2013 | Fowler et al. |
| 2013/0313170 A1 | 11/2013 | Bohm et al. |
| 2014/0033808 A1 | 2/2014 | Ding et al. |
| 2014/0050540 A1 | 2/2014 | Gilbert et al. |
| 2014/0091014 A1 | 4/2014 | Wagner et al. |
| 2014/0127688 A1* | 5/2014 | Umbarger ............ C12Q 1/6881 |
| | | 435/6.11 |
| 2014/0224710 A1 | 8/2014 | Di Carlo et al. |
| 2014/0273192 A1 | 9/2014 | Sharpe et al. |
| 2014/0287243 A1 | 9/2014 | Weber et al. |
| 2014/0318645 A1 | 10/2014 | Koksal et al. |
| 2014/0339446 A1 | 11/2014 | Yamamoto et al. |
| 2014/0361148 A1 | 12/2014 | Popescu et al. |
| 2015/0064694 A1 | 3/2015 | Sadri |
| 2015/0114093 A1 | 4/2015 | Appleyard et al. |
| 2015/0192511 A1 | 7/2015 | Wagner et al. |
| 2015/0198517 A1 | 7/2015 | Simpson et al. |
| 2015/0276588 A1 | 10/2015 | Marshall et al. |
| 2016/0004060 A1 | 1/2016 | Simpson et al. |
| 2016/0123858 A1 | 5/2016 | Kapur et al. |
| 2016/0199835 A1 | 7/2016 | Tachibana et al. |
| 2016/0303563 A1 | 10/2016 | Granier et al. |
| 2016/0368003 A1 | 12/2016 | Vester et al. |
| 2017/0016813 A1 | 1/2017 | Wagner |
| 2017/0181425 A1 | 6/2017 | Burbank et al. |
| 2017/0307505 A1 | 10/2017 | Vrane et al. |
| 2017/0333902 A1 | 11/2017 | Masaeli et al. |
| 2018/0266937 A1 | 9/2018 | De Wagenaar et al. |
| 2019/0025212 A1 | 1/2019 | Evans |
| 2019/0040356 A1 | 2/2019 | Durack et al. |
| 2019/0065674 A1 | 2/2019 | Holland |
| 2019/0071725 A1 | 3/2019 | Roti-Roti et al. |
| 2019/0160439 A1 | 5/2019 | Muto et al. |
| 2019/0187044 A1 | 6/2019 | Appleyard et al. |
| 2019/0382720 A1 | 12/2019 | Savage et al. |
| 2019/0390164 A1 | 12/2019 | Morjal et al. |
| 2020/0070152 A1 | 3/2020 | Kasai et al. |

(56) References Cited

U.S. PATENT DOCUMENTS

| | | | |
|---|---|---|---|
| 2022/0025443 | A1 | 1/2022 | Korani et al. |
| 2022/0026341 | A1 | 1/2022 | Appleyard et al. |

FOREIGN PATENT DOCUMENTS

| | | | |
|---|---|---|---|
| CN | 1482369 | A | 3/2004 |
| CN | 1886315 | | 12/2006 |
| CN | 101189504 | A | 5/2008 |
| CN | 104862273 | A | 8/2015 |
| CN | 1910441 | A | 2/2017 |
| CN | 105940301 | A | 6/2017 |
| CN | 101201313 | A | 6/2018 |
| CN | 109022562 | A | 12/2018 |
| CN | 109221081 | A | 1/2019 |
| CN | 109497040 | A | 3/2019 |
| CN | 109517787 | A | 3/2019 |
| EP | 0057907 | | 8/1982 |
| EP | 0282994 | | 9/1988 |
| EP | 0679325 | | 11/1995 |
| EP | 0471758 | B1 | 9/1996 |
| FR | 2798557 | | 3/2001 |
| GB | 502971 | A | 3/1939 |
| GB | 2507959 | A | 5/2014 |
| JP | 57131451 | | 8/1982 |
| JP | 58090513 | | 5/1983 |
| JP | S6426125 | A | 1/1989 |
| JP | 64074451 | | 3/1989 |
| JP | H02105041 | A | 4/1990 |
| JP | 03297385 | | 12/1991 |
| JP | H0526799 | | 2/1993 |
| JP | 06265452 | | 9/1994 |
| JP | 06327494 | | 11/1994 |
| JP | 07024309 | | 1/1995 |
| JP | H07286953 | A | 10/1995 |
| JP | 2552582 | | 11/1996 |
| JP | H10512952 | A | 12/1998 |
| JP | H11508182 | | 7/1999 |
| JP | 2000146819 | A | 5/2000 |
| JP | 2000512541 | | 9/2000 |
| JP | 2001504936 | | 4/2001 |
| JP | 2002503334 | | 1/2002 |
| JP | 2002153260 | | 5/2002 |
| JP | 2003106980 | A | 4/2003 |
| JP | 2003515738 | A | 5/2003 |
| JP | 2004093553 | A | 3/2004 |
| JP | 2005502482 | | 1/2005 |
| JP | 2005530986 | A | 10/2005 |
| JP | 2006524054 | A | 10/2006 |
| JP | 2007148981 | | 6/2007 |
| JP | 2007514522 | A | 6/2007 |
| JP | 2007515936 | A | 6/2007 |
| JP | 2008533440 | A | 8/2008 |
| JP | 2008261295 | A | 10/2008 |
| JP | 2009085872 | A | 4/2009 |
| JP | 2009115672 | A | 5/2009 |
| JP | 2009162660 | A | 7/2009 |
| JP | 2009-528063 | | 8/2009 |
| JP | 2010117197 | A | 5/2010 |
| JP | 2010151777 | A | 7/2010 |
| JP | 2010190680 | A | 9/2010 |
| JP | 2011145185 | | 7/2011 |
| JP | 2014503195 | A | 2/2014 |
| WO | WO9622521 | A1 | 7/1996 |
| WO | WO9700442 | | 1/1997 |
| WO | WO1997030338 | A1 | 8/1997 |
| WO | WO9739338 | | 10/1997 |
| WO | WO9747390 | | 12/1997 |
| WO | WO9810267 | | 3/1998 |
| WO | WO99/39223 | | 8/1999 |
| WO | WO0070080 | A1 | 11/2000 |
| WO | WO0118400 | | 3/2001 |
| WO | WO0131315 | | 5/2001 |
| WO | WO2001040766 | A1 | 6/2001 |
| WO | WO0185913 | A2 | 11/2001 |
| WO | WO2002006778 | A1 | 1/2002 |
| WO | WO0241906 | A2 | 5/2002 |
| WO | WO02081183 | A1 | 10/2002 |
| WO | WO02087792 | | 11/2002 |
| WO | WO03024163 | | 3/2003 |
| WO | WO03062867 | | 7/2003 |
| WO | WO03078065 | | 9/2003 |
| WO | WO2004012133 | A2 | 2/2004 |
| WO | WO2004029221 | | 4/2004 |
| WO | WO2004043506 | A1 | 5/2004 |
| WO | WO2004088283 | A3 | 10/2004 |
| WO | WO2005023391 | A3 | 3/2005 |
| WO | WO2005037471 | A1 | 4/2005 |
| WO | WO2005075629 | A1 | 8/2005 |
| WO | WO2006119806 | A1 | 11/2006 |
| WO | WO2007008495 | A2 | 1/2007 |
| WO | WO2007133710 | A2 | 11/2007 |
| WO | WO2008114458 | A1 | 9/2008 |
| WO | WO2008126064 | A2 | 10/2008 |
| WO | WO2008130977 | A2 | 10/2008 |
| WO | WO2009032449 | A1 | 3/2009 |
| WO | WO2009134395 | A2 | 11/2009 |
| WO | WO2010129441 | | 11/2010 |
| WO | WO2012068287 | A3 | 5/2012 |
| WO | WO2012112641 | A1 | 8/2012 |
| WO | WO2013018273 | A1 | 2/2013 |
| WO | WO2013173446 | A1 | 11/2013 |
| WO | 2015038494 | | 3/2015 |
| WO | WO2015063552 | A2 | 5/2015 |
| WO | WO2018047011 | A2 | 3/2018 |
| WO | WO2018151680 | A1 | 8/2018 |
| WO | WO-2019043015 | A1 * | 3/2019 ........... C12Q 1/6858 |
| WO | 2019236569 | A1 | 12/2019 |
| WO | 2020/025554 | A1 | 2/2020 |
| WO | WO2020092321 | A1 | 5/2020 |
| WO | WO-2020131699 | A2 * | 6/2020 ........... C12Q 1/6806 |
| WO | WO2020182193 | A1 | 9/2020 |

OTHER PUBLICATIONS

Ballenghien et al.,"Patterns of cross-contamination in a multispecies population genomic project: detection, quantification, impact, and solutions" BMC Biol.(2017), 15(1):25.,doi: 10.1186/s12915-017-0366-6. (Year: 2017).*

McClure et al., "SNP Data Quality Control in a National Beef and Dairy Cattle System and Highly Accurate SNP Based Parentage Verification and Identification", Front Genet. (2018) 15;9:84. doi: 10.3389/fgene.2018.00084 (Year: 2018).*

"AgriSeq HTS Library Kit User Guide"; Pub No. MAN0015971 D.0, published in 2017 (Year: 2017).*

Fiévet et al. ART-DeCo: easy tool for detection and characterization of cross-contamination of DNA samples in diagnostic next-generation sequencing analysis. Eur J Hum Genet. May 2019;27(5):792-800. Epub Jan. 25, 2019.; cited as NPL#1 in IDS filed Nov. 14, 2024 (Year: 2019).*

USPTO, "Final Office Action," issued in connection with U.S. Appl. No. 17/403,642, dated Mar. 4, 2022, 14 pages.

Australian Office Action, Application No. 2021200818, dated Mar. 4, 2022, 3 pages.

Jun et al. "Detecting and estimating contamination of human DNA samples in sequencing and array-based genotype data." The American Journal of Human Genetics 91.5 (2012): 839-848.

International Searching Authority, "International Search Report and Written Opinion," issued in connection with International Patent Application No. PCT/US21/56094, mailed Mar. 16, 2022, 22 pages.

USPTO, "Notice of Allowance," issued in connection with U.S. Appl. No. 17/496,469, dated May 10, 2022, 54 pages.

China National Intellectual Property Administration, "Notice of Allowance," issued in connection with Chinese Patent Application No. 201480071952.0, dated Mar. 21, 2022, 3 pages.

USPTO, "Non-Final Office Action," issued in connection with U.S. Appl. No. 17/403,642, dated Nov. 29, 2021, 13 pages.

Intellectual Property India, "Examination Report," issued in connection with Indian Patent Application No. 201917009874, mailed Nov. 25, 2021, 6 pages.

Australian Office Action, Application No. 2017323502, dated Oct. 22, 2021, 6 pages.

(56) References Cited

OTHER PUBLICATIONS

USPTO, "Non-Final Office Action," issued in connection with U.S. Appl. No. 17/692,876, dated Sep. 19, 2022, 21 pages.
USPTO, "Notice of Allowance," issued in connection with U.S. Appl. No. 17/403,642, mailed Sep. 29, 2022, 24 pages.
Brazilian Office Action, Application No. BR112019004727-1, mailed Mar. 20, 2023, 6 pages.
USPTO "Final Office Action," issued in connection with U.S. Appl. No. 16/852,303, mailed May 1, 2023, 33 pages.
USPTO, "Final Office Action," issued in connection with U.S. Appl. No. 16/741,608, dated Oct. 19, 2022, 12 pages.
USPTO, "Non-Final Office Action," issued in connection with U.S. Appl. No. 17/851,319, dated Nov. 2, 2022, 12 pages.
USPTO, "Final Office Action," issued in connection with U.S. Appl. No. 16/279,430, dated Dec. 6, 2022, 18 pages.
Notice of Allowance issued in U.S. Appl. No. 17/692,876 on Feb. 1, 2023, 24 pages.
European Patent Office, "European Search Report," issued in connection with European Patent Application No. 22190948.4, mailed Jan. 23, 2023, 10 pages.
European Patent Office, "Intention to Grant Notice," issued in connection with patent application No. 20167363.9, mailed Dec. 15, 2022, 8 pages.
Notice of Allowance issued in U.S. Appl. No. 16/741,608 on Feb. 7, 2023, 22 pages.
China Patent Office, "The Fifth Office Action," issued in connection with China Patent Application No. 2014800719520, Oct. 20, 2021, 7 pages.
USPTO, "Non-Final Office Action," issued in connection with U.S. Appl. No. 17/458,947, dated Dec. 15, 2021, 9 pages.
USPTO, "Notice of Allowance," issued in connection with U.S. Appl. No. 16/864,514, mailed Jan. 3, 2022, 24 pages.
USPTO, "Notice of Allowance," issued in connection with U.S. Appl. No. 16/419,756, mailed Jan. 12, 2022, 16 pages.
USPTO, "Non-Final Office Action," issued in connection with U.S. Appl. No. 16/852,303, dated Jan. 6, 2022, 27 pages.
Intellectual Property India, "Examination Report," issued in connection with Indian Patent Application No. 202147003036, mailed Jan. 4, 2022, 5 pages.
Di Carlo, "Inertial microfluidics." Lab on a Chip 9.21 (2009): 3038-3046.
Intellectual Property India, "Examination Report," issued in connection with Indian Patent Application No. 202017054203, mailed Jan. 7, 2022, 5 pages.
Kang, et al. "Effect of an osmotic differential on the efficiency of gene transfer by electroporation of fish spermatozoa." Aquaculture 173.1-4 (1999): 297-307. (Year: 1999).
Rieth et al. "Electroporation of bovine spermatozoa to carry DNA containing highly repetitive sequences into oocytes and detection of homologous recombination events." Molecular Reproduction and Development: Incorporating Gamete Research 57.4 (2000): 338-345.
Chamberland et al. "The effect of heparin on motility parameters and protein phosphorylation during bovine sperm capacitation." Theriogenology 55.3 (2001): 823-835. (Year: 2001).
Chan, et al. "Luminescent quantum dots for multiplexed biological detection and imaging." Current opinion in biotechnology 13.1 (2002): 40-46. (Year: 2002).
USPTO, "Non-Final Office Action," issued in connection with U.S. Appl. No. 16/561,146, dated Jan. 21, 2022, 14 pages.
USPTO, "Non-Final Office Action," issued in connection with U.S. Appl. No. 17/496,469, dated Jan. 28, 2022, 13 pages.
USPTO, "Final Office Action," issued in connection with U.S. Appl. No. 16/852,303, dated May 27, 2022, 48 pages.
USPTO, "Non-Final Office Action," issued in connection with U.S. Appl. No. 16/279,430, dated May 23, 2022, 14 pages.
European Patent Office, "Examination Report," issued in connection with patent application No. 20167363.9, mailed Mar. 22, 2022, 4 pages.
European Patent Office, "Examination Report," issued in connection with patent application No. 19182993.6, mailed May 10, 2022, 8 pages.
International Search Report and Written Opinion for Application Serial No. PCT/US2021/059148, dated May 4, 2022, 15 pages.
European Patent Office, "Communication under Rule 71(3) EPC," issued in connection with European Patent Application No. 16723498.8, mailed May 18, 2022, 54 pages.
IP Australia, "Notice of Acceptance for Patent Application," issued in connection with Australian Patent Application No. 2021200818, mailed Jun. 1, 2022, 3 pages.
China National Intellectual Property Administration, "Second Office Action," issued in connection with Chinese Patent Application No. 202080028183.1, mailed Jan. 13, 2023, 23 pages.
Notice of Allowance issued in U.S. Appl. No. 17/851,319 on Feb. 15, 2023, 52 pages.
USPTO, "Notice of Allowance," issued in connection with U.S. Appl. No. 16/852,303, mailed Sep. 20, 2023, 31 pages.
European Patent Office, "Communication pursuant to Article 94(3) EPC," issued in connection with European Patent Application No. 17808998.3, mailed Sep. 15, 2023, 4 pages.
European Patent Office, "European Search Report," issued in connection with patent application No. 20913158.0, mailed Sep. 20, 9 pages.
European Patent Office, "European Search Report," issued in connection with patent application No. 23169267.4 mailed Jul. 14, 2023, 5 pages.
Brazilian Office Action, Application No. BR112021012000-9, mailed Aug. 16, 2023, 4 pages.
USPTO, "Non-Final Office Action," issued in connection with U.S. Appl. No. 17/496,614, dated Dec. 21, 2022, 9 pages.
UPSTO, "Non-Final Office Action," issued in connection with U.S. Appl. No. 16/852,303, dated Jan. 9, 2023, 30 pages.
European Patent Office, "European Search Report," issued in connection with European Patent Application No. 20792020.8, mailed Dec. 23, 2022, 10 pages.
Brazilian Office Action, Application No. BR112020023607-1, mailed Dec. 12, 2022, 5 pages.
Ron Bardell et al. "Microfluidic disposables for cellular and chemical detection: CFD model results and fluidic verification experiments," Proc. SPIE 4265, Biomedical Instrumentation Based on Micro- and Nanotechnology, May 21, 2001; doi: 10.1117/12.427961 Invited Paper: BiOS 2001 The International Symposium on Biomedical Optics, 2001, San Jose, CA, United States, 14 pages.
USPTO, "Final Office Action," issued in connection with U.S. Appl. No. 16/741,608, dated Jun. 13, 2022, 11 pages.
USPTO, "Non-Final Office Action," issued in connection with U.S. Appl. No. 17/403,642, dated Jul. 13, 2022, 7 pages.
CNIPA, "First Office Action," issued in connection with Chinese Patent Application No. 202080028183.1, mailed Jul. 6, 2022, 21 pages.
Al-Holy et al., "The Use of Fourier Transform Infrared Spectroscopy to Differentiate *Escherichia coli* O157:H7 from Other Bacteria Inoculated Into Apple Juice," Food Microbiology, vol. 23, 2006, 162-168.
Alberts et al., "Molecular Biology of the Cell, 5th edition," New York: Garland Science, 2008, p. 1293.
Barcot et al., "Investigation of Spermatozoa and Seminal Plasma by Fourier Transform Infrared Spectroscopy," Applied Spectroscopy, vol. 61, No. 3, Mar. 2007, pp. 309-313.
Bassan et al; "Reflection Contributions to the Dispersion Artefact in FTIR Spectra of Single Biological Cells," Analyst, vol. 134, Apr. 9, 2009, pp. 1171-1175.
Bassan et al; "Resonant Mie Scattering in Infrared Spectrascopy of Biological Materials—Understanding the Dispersion Artefact," Analyst, vol. 134, 2009, pp. 1586-1593.
Bassan et al; "Resonant Mie Scattering {RMieS) Correction of Infrared Spectra From Highly Scattering Biological Samples," Analyst, vol. 135, No. 2, Feb. 2010, pp. 268-277.
Belkin et al.; "Intra-Cavity Absorption Spectroscopy with Narrow-Ridge Microfluidic Quantum Cascade Lasers," Optics Express, vol. 15, No. 18, Sep. 3, 2007, pp. 11262-11271.

(56) References Cited

OTHER PUBLICATIONS

Boustany et al.; "Microscopic Imaging and Spectroscopy with Scattered Light," Annual Review of Biomedical Engineering, vol. 12, 2010, pp. 285-314.
Chan et al.; "Nondestructive Identification of Individual Leukemia Cells by Laser Trapping Raman Spectroscopy," Analytical Chemistry, vol. 80, No. 6, Mar. 15, 2008, 8 pages.
Chan et al.; "Label-Free Biochemical Characterization of Stem Cells Using Vibrational Spectroscopy," Journal of Biophotonics vol. 2, No. 11, Aug. 5, 2009, pp. 656-668.
Chan et al.; "Label-Free Separation of Human Embryonic Stem Cells (hESCs) and their Cardiac Derivatives using Raman Spectroscopy," Lawrence Livermore Journal, LLNL-JRNL-406938, Sep. 11, 2008, 30 pages.
Chen et al,; "Synchrotron Infrared Measurements of Protein Phosphorylation in Living Single PC12 Cells during Neuronal Differentiation," Analytical Chemistry, vol. 84, 2012, pp. 4118-4125.
Cheng et al., "Laser-Scanning Coherent Anti-Stokes Raman Scattering Microscopy and Applications to Cell Biology," Biophysical Journal, vol. 83, Jul. 2002, pp. 502-509.
Cho et al., "Passively Driven Integrated Microfluidic System for Separation of Motile Sperm," Analytical Chemistry, vol. 75, Apr. 1, 2003, Abstract.
Genzen et al. "Laboratory-developed tests: a legislative and regulatory review." Clinical chemistry 63.10 (2017): 10 pages.
Cho et al., "A microfluidic device for separating motile sperm from nonmotile sperm via inter-streamline crossings," 2nd Annual International IEEE-EMBS Special Topic Conference on Microtechnologies in Medicine and Biology. Proceedings (Cat. No. 02EX578), 2002, pp. 156-159, doi: 10.1109/MMB.2002.1002304.
Cleary et al., "Infrared Surface Plasmon Resonance Biosensor," OSA Biomed, Miami, Florida, Apr. 2010, 11 pages.
Dousseau et al., "On the Spectral Subtraction of Water from the FT-IR Spectra of Aqueous Solutions of Proteins," Applied Spectroscopy, vol. 43, No. 3, 1989, pp. 538-542.
Downes et al., "Optical Spectroscopy for Noninvasive Monitoring of Stem Cell Differentiation," Journal of Biomedicine and Biotechnology, vol. 2010, Article ID 101864, 2010, 10 pages.
Ege, "Organic Chemistry: Structure and Reactivity," Fifth Edition, Boston, MA, Houghton Mifflin Company, 2004, pp. 453-457.
European Patent Office, "Extended European Search Report," issued in connection with European Patent Application No. 11841869.8, mailed Feb. 15, 2018, 9 pages.
Fu et al., "A Microfabricated Fluorescence-Activated Cell Sorter," Nature Biotechnology, vol. 17, Nov. 1999, pp. 1109-1111.
Green et al., "Flow Cytometric Determination of Size and Complex Refractive Index for Marine Particles: Comparison with Independent and Bulk Estimates," Applied Optics, vol. 42, No. 3, Jan. 20, 2003, pp. 526-541.
Harvey et al., "Discrimination of Prostate Cancer Cells by Reflection Mode FTIR Photoacoustic Spectroscopy," The Analyst, vol. 132, 2007, pp. 292-295.
Herzenberg et al., "Fluorescence-activated Cell Sorting," Scientific American, vol. 234, Mar. 1976, pp. 108-117.
Holman et al., "Synchrotron-Based FTIR Spectromicroscopy: Cytotoxicity and Heating Considerations," Journal of Biological Physics, vol. 29, 2003, pp. 275-286.
Holman et al., "IR Spectroscopic Characteristics of Cell Cycle and Cell Death Probed by Synchrotron Radiation Based Fourier Transform IR Spectromicroscopy," Biopolymers (Biospectroscopy) vol. 57, 2000, pp. 329-335.
Holman et al., "Tracking Chemical Changes in a Live Cell: Biomedical Applications of SR-FTIR Spectromicroscopy," Lawrence Berkeley National Laboratory, http://escholarship.org/uc/item/9k185794, Berkeley, CA Jul. 25, 2002, 34 pages.
Huser et al., "Raman Spectroscopy of DNA Packaging in Individual Human Sperm Cells Distinguishes Normal From Abnormal Cells," Journal of Biophotonics, vol. 2, No. 5, 2009, pp. 322-332.
Intel, "Intel C-bank Tunable Laser, Performance and Design," White Paper, May 2003, 14 pages.
International Searching Authority, "International Search Report and Written Opinion," International Patent Application No. PCT/US2013/041123, mailed Aug. 19, 2013, 12 pages.
International Search Authority, "International Preliminary Report on Patentability," International Patent Application No. PCT/US2011/061046, mailed May 30, 2013, 7 pages.
International Searching Authority, "International Preliminary Report on Patentability," International Patent Application No. PCT/US2013/041123, Nov. 18, 2014, 7 pages.
Japan Patent Office, "Office Action," issued in connection with Japanese Patent Application No. 2013-539983, Jul. 8, 2015, 6 pages.
Japan Patent Office, "Office Action," issued in connection with Japanese Patent Application No. 2013-539983, Jul. 2, 2016, 6 pages.
Japan Patent Office, "Office Action," issued in connection with Japanese Patent Application No. 2016-198323, Jul. 25, 2018, 9 pages.
Lee et al., "DFB Quantum Cascade Laser Arrays," IEEE Journal of Quantum Electronics, vol. 45, No. 5, May 2009, pp. 554-565.
Libbus et al., "Incidence of Chromosome Aberrations in Mammalian Sperm Stained with Hoechst 33342 and UV-Laser Irradiated During Flow Sorting," Mutation Research, vol. 182, 1987, pp. 265-274.
Malone, Jr., "Infrared Microspectroscopy: A Study of the Single Isolated Bread Yeast Cell," Thesis, The Ohio State University, 2010, 162 pages.
Meister et al., "Confocal Raman Microspectroscopy as an Analytical Tool to Assess the Mitochondrial Status in Human Spermatozoa," Analyst, vol. 135, 2010, pp. 1370-1374.
Miyamoto et al., "Label-free Detection and Classification of DNA by Surface Vibration Spectroscopy in Conjugation with Electrophoresis," Applied Physics Letters, vol. 86, No. 053902, 2005, 3 pages.
Mohlenhoff et al., "Mie-Type Scattering and Non-Beer-Lambert Absorption Behavior of Human Cells in Infrared Microspectroscopy," Biophysical Journal, vol. 88, May 2005, pp. 3635-3640.
Montag et al., "Laser-induced Immobilization and Plasma Membrane Permeabilization in Human Spermatozoa," Human Reproduction, vol. 15, No. 4, 2000, pp. 846-852.
Mourant et al., "Methods for Measuring the Infrared Spectra of Biological Cells," Physics in Medicine and Biology, vol. 48, 2003, pp. 243-257.
Van Munster, "Interferometry in Flow to Sort Unstained X-and Y-Chromosome-Bearing Bull Spermatozoa," Cytometry, vol. 47, 2002, pp. 192-199.
Rajagopalan et al., "Aneuploidy and Cancer," Nature, vol. 432, Nov. 2004, pp. 338-341.
Ropcke et al., "Application of Mid-Infrared Tuneable Diode Laser Absorption Spectroscopy to Plasma Diagnostics: A Review," Plasma Sources Science and Technology, vol. 15, 2006, S148-S168.
Schaden et al., "Quantum Cascade Laser Modulation for Correction of Matrix-Induced Background Changes in Aqueous Samples," Applied Physics B, vol. 86, 2007, pp. 347-351.
Sandt et al., "Identification of Spectral Modifications Occurring during Reprogramming of Somatic Cells," PLoS ONE, vol. 7, Issue 4, e30743, Apr. 2012, 7 pages.
National Institute of Industrial Property (INPI) Argentina, "Examination Report," issued in connection with Argentina Patent Application No. 20190101378, mailed Apr. 19, 2023, 8 pages.
China National Intellectual Property Administration, "Decision of Rejection," issue in connection with Chinese Patent Application No. 202080028183.1, mailed Jun. 7, 2023, 23 pages.
USPTO, "Non-Final Office Action," issued in connection with U.S. Appl. No. 17/164,710, dated Jun. 26, 2023, 13 pages.
New Zealand IP Office, "First Examination Report," issued in connection with New Zealand Patent Application No. 751869, mailed Aug. 12, 2022, 3 pages.
Canadian Office Action, Application No. 3,034,007, mailed Aug. 25, 2022, 3 pages.

(56) References Cited

OTHER PUBLICATIONS

USPTO, "Non-Final Office Action," issued in connection with U.S. Appl. No. 16/741,608, dated Mar. 18, 2022, 12 pages.
USPTO, "Notice of Allowance," issued in connection with U.S. Appl. No. 17/412,789, mailed Mar. 21, 2022, 30 pages.
USPTO, "Notice of Allowance," issued in connection with U.S. Appl. No. 17/458,947, dated Mar. 31, 2022, 30 pages.
USPTO, "Final Office Action," issued in connection with U.S. Appl. No. 16/741,608, dated Oct. 21, 2021, 11 pages.
State Intellectual Property Office of People's Republic of China, "First Office Action," issued in connection with Chinese Patent Application No. 2018801002551, Jan. 26, 2024, 8 pages.
USPTO, "Non-Final Office Action," issued in connection with U.S. Appl. No. 17/525,125, mailed Mar. 7, 2024, 15 pages.
ThermoFisher, Optics of a Flow Cytometer, Sep. 2020, ThermoFisher, https://www.thermofisher.com/us/en/home/life-science/cell-analysis/cell-analysis-learning-center/molecular-probes-school-of-fluorescence/flow-cytometry-basics/flow-cytometry-fundamentals/optics-flow-cytometer.html (Year: 2020), 76 pages.
De Novo, Flow Cytometery: a basic introduction, Sep. 2019, De Novo, Chapter 2: The Flow cytometer, https://flowbook.denovosoftware.com/chapter-2-flow-cytometer (Year: 2019), 10 pages.
Fievet et al., ART-Deco: easy tool for detection and characterization of cross-contamination of DNA samples in diagnostic next-generation sequencing analysis, European Journal of Human Genetics, vol. 27, No. 5, Jan. 25, 2019, pp. 792-800.
European Patent Office, "Extended European Search Report," issued in connection with patent application 21883920.7 dated Sep. 9, 2024.
European Patent Office, "Extended European Search Report," issued in connection with patent application 21895392.5 dated Sep. 4, 2024.
Sell, "Cellular Origin of Cancer: Dedifferentiation or Stem Cell Maturation Arrest?", Environmental Health Perspectives, vol. 101, Suppl. 5, 1993, p. 15-26.
Shapiro et al., "Pratical Flow Cytometry," Fourth Edition, New Jersey: John W. Wiley & Sons, 2003, 52 pages.
Sharpe et al.,"Advances in Flow Cytometry for Sperm Sexing," Theriogenology, vol. 71, 2009, pp. 4-10.
Short, "Raman Spectroscopy Detects Biochemical Changes Due to Proliferation in Mammalian Cell Cultures," Biophysical Journal, vol. 88, Jun. 2005, pp. 4274-4288.
USPTO, "Non-Final Office Action," issued in connection with U.S. Appl. No. 15/226,899, mailed Apr. 12, 2018, 14 pages.
USPTO, "Notice of Allowance," issued in connection with U.S. Appl. No. 15/226,899, mailed Aug. 23, 2018, 5 pages.
USPTO, "Notice of Allowance," issued in connection with U.S. Appl. No. 15/226,899, mailed Sep. 20, 2018, 6 pages.
USPTO, "Final Office Action," issued in connection with U.S. Appl. No. 15/174,681, mailed Jan. 2, 2018, 15 pages.
USPTO, "Final Office Action," issued in connection with U.S. Appl. No. 15/174,681, mailed Sep. 14, 2018, 17 pages.
USPTO, "Non-Final Office Action," issued in connection with U.S. Appl. No. 15/174,681, mailed May 4, 2017, 13 pages.
USPTO, "Non-Final Office Action," issued in connection with U.S. Appl. No. 15/174,681, mailed Apr. 5, 2018, 16 pages.
USPTO, "Notice of Allowance," issued in connection with U.S. Appl. No. 15/174,681, mailed Nov. 27, 2018, 10 pages.
USPTO, "Final Office Action," issued in connection with U.S. Appl. No. 13/298,148, mailed Oct. 18, 2013, 46 pages.
USPTO, "Non-Final Office Action," issued in connection with U.S. Appl. No. 13/298,148, mailed Feb. 5, 2013, 66 pages.
USPTO, "Notice of Allowance," issued in connection with U.S. Appl. No. 13/298,148, mailed Sep. 19, 2014, 9 pages.
USPTO, "Office Action," issued in connection with U.S. Appl. No. 13/298,148, mailed Sep. 28, 2012, 5 pages.
USPTO, "Final Office Action," issued in connection with U.S. Appl. No. 13/894,831, mailed Sep. 10, 2015, 11 bages.
USPTO, "Final Office Action," issued in connection with U.S. Appl. No. 13/894,831, mailed Jun. 15, 2017, 19 pages.
USPTO, "Non-Final Office Action," issued in connection with U.S. Appl. No. 13/894,831, mailed Dec. 23, 2014, 11 pages.
USPTO, "Non-Final Office Action," issued in connection with U.S. Appl. No. 13/894,831, mailed Oct. 5, 2016, 17 pages.
USPTO, "Notice of Allowance," issued in connection with U.S. Appl. No. 13/894,831, mailed Apr. 1, 2016, 8 pages.
USPTO, "Notice of Allowance," issued in connection with U.S. Appl. No. 13/894,831, mailed Sep. 5, 2017, 9 pages.
Wang et al., Detection of endogenous biomolecules in Barrett's esophagus by Fourier transform infrared spectroscopy, PNAS, vol. 104, No. 40, Oct. 2, 2007, p. 15864-15869.
Webster, Merriam, "Definition of "successive," Merriam Webster's Online Dictionary, accessed at http://www.merriamwebster.com/dictionary/successive," Jul. 3, 2013, 1 page.
Weida et al., "Quantum cascade laser-based replacement for FTIR microscopy", Proc. SPIE 7902, Imaging, Manipulation, and Analysis of Biomolecules, Cells, and Tissues IX, 79021C, Feb. 11, 2011; 7 pages; https://doi.org/10.1117/12.873954.
International Bureau, "International Preliminary Report on Patentability," issued in connection with International Patent Application No. PCT/IB2017/001289, mailed Mar. 21, 2019, 12 pages.
International Search Report and Written Opinion for Application Serial No. PCT/IB2017/001289, dated Apr. 3, 2018, 21 pages.
Mehrnoush Malek et al: flowDensity: reproducing manual gating of flow cytometry data by automated density-based cell population identification, Bioinformatics., vol. 31, No. 4, Oct. 16, 2014 (Oct. 16, 2014), pp. 606-607.
International Search Report and Written Opinion for Application Serial No. PCT/IB2018/001641, dated Nov. 5, 2019, 4 pages.
China Patent Office, "The Fourth Office Action," issued in connection with China Patent Application No. 201480071952.0, Feb. 3, 2021, 25 pages.
Japan Patent Office, "Notice of Reasons for Refusal," issued in connection with Japan Patent Application No. 2019-088655, Oct. 9, 2020, 5 pages.
Johnson LA et al., Flow sorting of X and Y chromosome-bearing spermatozoa into two populations, Gamete Research. Jan. 1987 16(1):1-9. (Johnson 1987).
Paape et al., Flow Cytometry: A Versatile Tool for Studies on Cells From Domestic Animals, National Cytometry Symposium, Abstract Only, Dec. 14, 1997, https://www.ars.usda.gov/research/publications/publication/?seqNo115=86408.
Keij, J.F. et al., "High-Speed Photodamage Cell Selection Using a Frequency-Doubled Argon Ion Laser." Cytometry 19 (1995): 209-216. (Keij 1995).
Keij, J.F., "Introduction to High-Speed Flow Sorting." Flow and Image Cytometry. Series H: Cell Biology, 95 (1996): 213-227. (Keij 1996).
Johnson et al. "The Beltsville sperm sexing technology: high-speed sperm sorting gives improved sperm output for in vitro fertilization and AI." J Anim Sci 1999. 77:213-220.
ABS Global, Inc. and Genus PLC's Renewed Motion for Judgment as a Matter of Law That the Asserted Claims of the '987 Patent Are Invalid for Lack of Enablement and, in the Alternative, for a New Trial. *ABS Global, Inc.* v. *Inguran, LLC & XY, LLC* v. *Genus PLC.* Case: 3:14-cv-00503-wmc. Filed on Jul. 3, 2020, 40 pages.
ABS Global, Inc. and Genus Plc Renewed Motion for Judgment as a Matter of Law That the Asserted Claims of the 987 Patent Are Invalid for Lack of Enablement and, in the Alternative, for a New Trial. *Inguran, LLC d/b/a Stgenetics, XY, LLC, and Cytonome/ST, LLC*, Plaintiffs/Counterclaim-Defendants, v.*ABS Global, Inc., 3enus PLC, and Premium Genetics* (UK) *LTD*, Defendants/Counterclaim-Plaintiffs. Case: 3:17-cv-00446-wmc. filed Jul. 3, 2020, 72 pages.
ABS Global, Inc. and Genus PLC's Reply in Support of Their Renewed Motion for Judgment as a Matter of Law That the Asserted Claims of the '987 Patent Are Invalid for Lack of Enablement and, in the Alternative, for a New Trial. *Inguran, LLC d/b/a Stgenetics, XY, LLC, and Cytonome/ST, LLC*, Plaintiffs/Counterclaim-Defendants, v. *ABS Global, Inc., Genus Plc, and Premium Genetics* (UK) *LTD*, Defendants/Counterclaim-Plaintiffs. Case: : 17-cv-00446-wmc. Filed Aug. 17, 2020, 40 pages.
ABS Global, Inc. and Genus PLC's Motion for Judgment as a Matter of Law That the Asserted Claims of the 987 and '092 Patents

(56) References Cited

OTHER PUBLICATIONS

Are Invalid. *ABS Global, Inc.*, Plaintiff/Counterclaim Defendant, v. *Inguran, LLC d/b/a Sexing Technologies*, Defendant/Counterclaim Plaintiff, *and XY, LLC*, Intervenor-Defendant/Counterclaim Plaintiff, v. *Genus PLC*, Counterclaim Defendant. Case: 3:14-cv-00503-wmc. Filed Aug. 9, 2016, 35 pages.

ABS Global, Inc. and Genus PLC's Rule 50(8) Motion for Judgment as a Matter of Law and Rule 59 Motion for a New Trial. *ABS Global, Inc.*, Plaintiff/Counterclaim Defendant, v. *Inguran, LLC d/b/a Sexing Technologies*, Defendant/Counterclaim Plaintiff, *and XY, LLC*, Intervenor-Defendant/Counterclaim Plaintiff, v. *Genus PLC*, Counterclaim Defendant. Case: 3:14-cv-00503-wmc. Filed Sep. 2, 2016, 61 pages.

Opinion and Order of the *United States District Court for the Western District of Wisconsin*. Plaintiff/Counterclaim Defendant, v. *Inguran, LLC d/b/a Sexing Technologies*, Defendant/Counterclaim Plaintiff, *and XY, LLC*, Intervenor-Defendant/Counterclaim Plaintiff, v. *Genus PLC*, Counterclaim Defendant. Case: 3:14-cv-00503-wmc. riled Mar. 31, 2017, 18 pages.

Judge's Opinion & Order in Case No. 14-cv-503-wmc. Plaintiff/Counterclaim Defendant, v. *Inguran, LLC di b/a Sexing Technologies*, Defendant/Counterclaim Plaintiff, *and XY, LLC*, Intervenor-Defendant/Counterclaim Plaintiff, v. *Genus PLC*, Counterclaim Defendant. Case: 3:14-cv-00503-wmc. Filed Jul. 21, 2016, 41 pages.

ABS Global Inc. and Genus PLC's Reply in Support of Their Motion for Claim Construction and Partial Summary Judgment, *ABS Global, Inc.* v. *Inguran, LLC d/b/a Sexing Technologies*, Case No. 14-cv-503, United States District Court for the Western District of Wisconsin. Mar. 7, 2016, 55 pages.

Altendorf et al., "Results Obtained Using a Prototype Microfluidics-Based Hematology Analyzer," in Proceedings of the microTAS 1998 Symposium, 73-76 (Oct. 1998).

Nieuwenhuis et al., "Particle-Shape Sensing-Elements for Integrated Flow Cytometer," in Proceedings of the microTAS 2001 Symposium, 357-358 (Oct. 21, 2001).

Nieuwenhuis et al. "Virtual Flow Channel: A Novel Micro-fluidics System with Orthogonal, Dynamic Control of Sample Flow Dimensions," in Proceedings of the microTAS 2002 Symposium, vol. 1, 103-105 (Nov. 3, 2002).

Nieuwenhuis, J., et al. "Integrated flow-cells for novel adjustable sheath flows." Lab Chip, 2003, 3, 56-61 (Mar. 2003).

Shoji, S., et al. "Design and fabrication of micromachined chemical/biochemical systems." Riken Rev., vol. 36, pp. 8-11, 2001.

Lin, C., et al. "A Novel Microflow Cytometer with 3-dimensional Focusing Utilizing Dielectrophoretic and Hydrodynamic Forces." The Sixteenth Annual International Conference on Micro Electro Mechanical Systems, 2003. MEMS-03 Kyoto. IEEE, Kyoto, Japan, 2003, pp. 439-442.

Miyake et al., "A Development of Micro Sheath Flow Chamber," in Proceedings of the IEEE Micro Electro Mechanical Systems Workshop 1991, 265-270 (Jan. 1991).

Tashiro et al., "Design and Simulation of Particles and Biomolecules Handling Micro Flow Cells with Three-Dimensional Sheath Flow," in Proceedings of the microTAS 2000 Symposium, 209-212 (May 14, 2000).

Weigl, B. et al. "Design and Rapid Prototyping of Thin-Film Laminate-Based Microfluidic Devices." Biomedical Microdevices, 3:4, pp. 267-274, 2001.

Blankenstein, G. et al. "Modular concept of a laboratory on a chip for chemical and biochemical analysis." Biosensors & Bioelectronics, vol. 13. No 3-4, pp. 427-438, 1998.

Shapiro, Practical Flow Cytometry, 15-17, 133-135 (3rd ed. 1995).

Shapiro, Practical Flow Cytometry, 55-57, 166-169 (4th ed. 2003).

International Search Report for PCT Patent Application No. PCT/IB2014/001425 dated Apr. 28, 2015.

Herweijer, H. et al., "High Speed Photodamage Cell Selection Using Bromodeoxyuridine/Hoechst 33342 Photosensitized Cell Killing", Radiobiological Institute TNO, Rotterdam, The Netherlands, Jun. 1, 1987.

Johnson, L.A., et al., "Sex Preselection: High-Speed Flow Cytometric Sorting of X and Y Sperm for Maximum Efficiency" U.S. Dept. of Agriculture, Beltsville, MD, Sep. 23, 1999.

Bazyer H., et al., "Views and Reviews—Compact 151W Green Laser with U-Type Resonator for Prostate Surgery", Optics & Laser Technology, vol. 47, Apr. 27, 2013, 237-241.

Keij, J. et al, "High-Speed Photodamage Cell Sorting: An Evaluation of the Zapper Prototype", Methods in Cell Biology, 1994; pp. 371-386, vol. 42, Chapter 22, Academic Press, Inc.

International Search Report and Written Opinion issued on Mar. 7, 2014 in connection with PCT/US2013/050669.

Kachel, V, et al., "Uniform Lateral Orientation, caused by Flow Forces, of Flat Particles in Flow-Through Systems", The Journal of Histochemistry and Cytochemistry, vol. 25, No. 7, pp. 774-780, 1977.

Notice of Allowance issued in U.S. Appl. No. 13/943,322 on Sep. 12, 2014.

Fulwler, M., "Hydrodynamic Orientation of Cells", The Journal of Histochemistry and Cytochemistry, vol. 25, No. 7, pp. 781-783, 1977.

Khodjakov A., et al., "A Synergy of Technologies: Combining Laser Microsurgery with Green Fluorescent Protein Tagging", Cell Motility and the Cytoskeleton 38:311-317 (1997), Division of Molecular Medicine and Department of Biomedical Sciences, Albany, New York.

Canadian Office Action, Application No. 2,929,275, mailed May 4, 2020, 8 pages.

Australian Office Action, Application No. 2019202882, mailed Mar. 26, 2020, 3 pages.

Brazilian Office Action, Application No. BR122017012966-0, mailed Jun. 2, 2020, 6 pages.

Japan Patent Office, "Reconsideration Report before Appeal," issued in connection with Japanese Patent Application No. 2016-551082, mailed Jul. 12, 2019, 17 pages.

Intellectual Property India, "Examination Report," issued in connection with Indian Patent Application No. 3425/DELNP/2015, mailed Jan. 20, 2020, 6 pages.

European Patent Office, "Extended European Search Report," issued in connection with patent application No. 19182993.6, mailed Oct. 21, 2019, 11 pages.

China National Intellectual Property Administration, "Second Office Action," issued in connection with Chinese Patent Application No. 201480071952.0, mailed Nov. 26, 2018, 34 pages.

China National Intellectual Property Administration, "Decision of Rejection," issued in connection with Chinese Patent Application No. 201480071952.0, mailed Mar. 4, 2019, 19 pages.

IP Australia, "Examination Report No. 1 for Standard Patent Application," issued in connection with Australian Patent Application No. 2014343391, mailed Sep. 4, 2018, 3 pages.

International Preliminary Report on Patentability, issued in connection with application PCT/IB2014/001425, May 3, 2016, 11 pages.

Japan Patent Office, "Non Final Notice of Reasons for Rejection," issued in connection with Japanese Patent Application No. 2016-551082, mailed Apr. 24, 2018, 5 pages.

New Zealand IP Office, "Further Examination Report," issued in connection with New Zealand Patent Application No. 720575, mailed Apr. 28, 2017, 3 pages.

State Intellectual Property Office of People's Republic of China, "Notification of First Office Action," issued in connection with Chinese Patent Application No. 201480071952.0, mailed Mar. 16, 2018, 31 pages.

New Zealand IP Office, "Further Examination Report," issued in connection with New Zealand Patent Application No. 735496, mailed Aug. 31, 2018, 2 pages.

Drobnis et al., Cold Shock Damage is due to Lipid Phase Transitions in Cell Membranes: A Demonstration Using Sperm as a Model, The Journal of Experimental Zoology, 1993, 265:432-437.

Way et al., Comparison of four staining methods for evaluating acrosome status and viability of ejaculated and cauda epididymal bull spermatozoa, Theriogenology, 1995, 43(8): 1301-1316.

Marian et al., Hypo-osmotic Shock Induces an Osmolality-dependent Permeabilization and Structural Changes in the Membrane of Carp Sperm, 1993, 41(2):291-297.

(56) References Cited

OTHER PUBLICATIONS

Molecular Probes Inc., Product Information, Influx Pinocytic Cell-Loading Reagent (I-14402), Revised Feb. 1, 2001, 1-7.
Parks, Processing and Handling Bull Semen for Artificial Insemination—Don't Add Insult to Injuryl, Department of Animal Sciences, Cornell University, 2013, retrieved on May 29, 2015, retrieved from the internet: http://www/ansci.cornell.edu/bullsemen.pdf.
Mammal (Online Datasheet), Wikipedia, 2003, retrieved on Aug. 13, 2018, retrieved from internet: http://web.archive.org/web/20031230110838/hllps://en.wikipedia.org/wiki/Mammal.
International Searching Authority, "International Search Report and Written Opinion," issued in connection with International Patent Application No. PCT/IB2016/000295, mailed Oct. 14, 2016, 19 pages.
International Bureau, "International Preliminary Report on Patentability," issued in connection with International Patent Application No. PCT/IB2016/000295, mailed Aug. 31, 2017, 14 pages.
Japan Patent Office, "Office Action," issued in connection with Japanese Patent Application No. 2017-543990, Jul. 31, 2019, 23 pages.
Di Carlo et al. "Equilibrium Separation and Filtration of Particles Using Differential Inertial Focusing" Anal. Chem. 2008, 80, 2204-2211 (Year: 2008).
"Hydraulic Diameter", Neutrium, Apr. 1, 2012, https://neutrium.net/fluid-flow/hydraulic-diameter/ (Year: 2012).
Gossett et al. "Particle Focusing Mechanisms in Curving Confined Flows" Anal. Chem. 2009, 81, 8459-8465 (Year: 2009).
Di Carlo et al. "Continuous inertial focusing, ordering, and separation of particles in microchannels" PNAS Nov. 27, 2007 vol. 104 No. 48 18893 (Year: 2007).
Jokinen, Ville, et al. "Durable superhydrophobicity in embossed CYTOP fluoropolymer micro and nanostructures", Colloids and Surfaces A: Physicochemical and Engineering Aspects, vol. 434, 2013, pp. 207-212.
Forsberg et al. "Cassie-Wenzel and Wenzel-Cassie transitions on immersed superhydrophobic surfaces under hydrostatic pressure", Soft Matter, vol. 7, No. 1, 2011, pp. 104-109.
Lu et al. "Photochemical reactions and on-line UV detection in microfabricated reactors", Lab on a Chip, vol. 1, No. 1, 2001, pp. 22-28.
Japan Patent Office, "Office Action," issued in connection with Japanese Patent Application No. 2019-513891, Jun. 17, 2021, 11 pages.
Brazilian Office Action, Application No. BR112019004727-1, mailed Jul. 6, 2021, 4 pages.
Australian Office Action, Application No. 2017323502, mailed Jun. 28, 2021, 6 pages.
China Office Action, Application No. 201780056064.5, mailed Apr. 26, 2021, 8 pages.
China Office Action, Application No. 201780056064.5, mailed Nov. 4, 2020 11 pages.
Europe Office Action, Application No. 17808998.3, mailed Jul. 21, 2020, 8 pages.
Pedreira et al: "Overview of clinical flow cytometry data analysis: recent advances and future challenges", Trends in Biotechnology, Elsevier Publications, Cambridge, GB, vol. 31, No. 7, Jul. 5, 2013, 12 pages.
China Patent Office, "The Third Office Action," issued in connection with China Patent Application No. 201480071952.0, mailed Jul. 23, 2020, 23 pages.
Intellectual Property India, "Examination Report," issued in connection with Indian Patent Application No. 3429/DELNP/2015, mailed Mar. 26, 2018, 6 pages.
European Patent Office, "European Search Report," issued in connection with patent application No. 20167363.9, mailed Jul. 21, 2020, 9 pages.
Japan Patent Office, "Notice of Reasons for Refusal," issued in connection with Japan Patent Application No. 2018-220397, Jul. 31, 2020, 3 pages.
European Patent Office, "Examination Report," issued in connection with European Patent Application No. 16723498.8, mailed Oct. 12, 2020, 6 pages.
European Patent Office, "European Search Report," issued in connection with European Patent Application No. 14168200.5, mailed Mar. 20, 2015, 12 pages.
European Patent Office, "European Search Report," issued in connection with European Patent Application No. 17172322.4, mailed Aug. 24, 2017, 8 pages.
European Patent Office, "European Search Report," issued in connection with European Patent Application No. 15160613.4, mailed Jul. 24, 2015, 14 pages.
European Patent Office, "Communication pursuant to Article 94(3) EPC, " issued in connection with European Patent Application No. 17172322.4, mailed Aug. 14, 2018, 5 pages.
European Patent Office, "Communication pursuant to Article 94(3) EPC," issued in connection with European Patent Application No. 11193936.9, mailed Dec. 11, 2015, 3 pages.
European Patent Office, "Communication pursuant to Article 94(3) EPC," issued in connection with European Patent Application No. 15160613.4, mailed Jul. 11, 2016, 4 pages.
Japan Patent Office, "Notification of Reasons for Refusal," issued in connection with Japanese Patent Application No. 2016-185743, mailed Jul. 3, 2018, 4 pages.
Japan Patent Office, "Final Notification of Reasons for Rejection," issued in connection with Japanese Patent Application No. 2011-256171, mailed Oct. 28, 2014, 5 pages.
Japan Patent Office, "Decision for Grant," issued in connection with Japanese Patent Application No. 2015-091320, mailed May 9, 2017, 7 pages.
Japan Patent Office, "Final Notification of Reasons for Rejection," issued in connection with Japanese Patent Application No. 2015-091320, mailed Mar. 22, 2016, 22 pages.
Japan Patent Office, "Notification of Reasons for Refusal," issued in connection with Japanese Patent Application No. 2016-185743, mailed Jul. 26, 2017, 2 pages.
Smith et al., "Inexpensive Optical Tweezers for Undergraduate Laboratories," Am. J. Phys., vol. 67, No. 1, Jan. 1999, 10 pages.
Takayama et al., "Patterning Cells and Their Environments Using Multiple Laminar Fluid Flows in Capillary Networks," Proceedings of National Academy of Sciences, vol. 96, 1999, 4 pages.
Guéron et al., Excited states of nucleic acids. Edited by Ts'o, P. O. P., & Eisinger, J. Basic principles in nucleic acid chemistry. New York: Academic Press. pp. 311-387. 1974.
Japan Patent Office; "Notice of Reasons for Refusal," issued in connection with Japanese Patent Application No. 2019-088655, mailed Feb. 18, 2020, 5 pages.
International Preliminary Report on Patentability corresponding to International Patent Application No. PCT/US2013/050669, mailed Jan. 28, 2016, 15 pages.
Supplementary European Search Report for Application No. 13889551.1, dated May 22, 2017, 12 pages.
State Intellectual Property Office of People's Republic of China, "Second Office Action," issued in connection with Chinese Patent Application No. 201380079634.4, Jun. 4, 2018, 14 pages.
Japan Patent Office, "Notice of Reasons for Rejection," issued in connection with Japanese Patent Application No. 2017-168904, Jul. 6, 2018, 3 pages.
State Intellectual Property Office of People's Republic of China, "Third Office Action," issued in connection with Chinese Patent Application No. 201380079634.4, Nov. 1, 2018, 20 pages.
Japanese Office Action for Application No. 2016-527978 dated Mar. 24, 2017, 6 pages.
State Intellectual Property Office of People's Republic of China, "First Office Action," issued in connection with Chinese Patent Application No. 201380079634.4, Jul. 28, 2017, 18 pages.
Indian Patent Application No. 3425/DELNP/2015 Pre-Grant Opposition, mailed Dec. 4, 2020, 138 pages.
Indian Patent Application No. 3425/DELNP/2015 Pre-Grant Opposition, mailed Jul. 21, 2020, 59 pages.
Indian Patent Application No. 3425/DELNP/2015 Pre-Grant Opposition, mailed Jul. 21, 2020, 96 pages.

(56) References Cited

OTHER PUBLICATIONS

Indian Patent Application No. 3425/DELNP/2015 Pre- Grant Opposition, mailed Jul. 2, 2020,137 pages.
Lee et al., The potential of a dielectrophoresis activated cell sorter (DACS) as a next generation cell sorter. Micro and Nano Syst Lett. 2016;4:2, 10 pages.
Maser et al., Nanoparticle injector for photonic manipulators using dielectrophoresis. AIP Advances 9.6 (2019): 065109, 8 pages.
Morgan et al., Separation of Submicron Bioparticles by Dielectrophoresis. Biophysical Journal. vol. 77, 1999, pp. 516-525.
Sutera et al., The history of Poiseuille's law. Annual Review of Fluid Mechanics, 25.1 (1993): pp. 1-20.
Trial Transcript, Sep. 5, 2019 (a.m.); *ABS Global, Inc.* v. *Inguran, LLC d/b/a Sexing Technologies*, Case Nos. 17-cv-446 and 14-cv-503, United States District Court for the Western District of Wisconsin, 14 pages.
Brief in Support of ABS Global, Inc. and Genus PLC's Rule 50(8) Motion for Judgment as a Matter of Law and Rule 59 Motion for a New Trial, *ABS Global, Inc.* v. *Inguran, LLC d/b/a Sexing Technologies*, Case No. 14-cv-503, United States District Court for the Western District of Wisconsin. Filed Sep. 2, 2016. 72 pages.
ST's Response to ABS's Renewed Motion for Judgment as a Matter of Law That the Asserted Claims of the '987 Patent Are Invalid for Lack of Enablement and, in the Alternative, for a New Trial, *ABS Global, Inc.* v. *Inguran, LLC d/b/a Sexing Technologies*, Case No. 14-cv-503, United States District Court for the Western District of Wisconsin. Filed: Jul. 24, 2020. 40 pages.
Dicarlo "Continuous inertial focusing, ordering, and separation of particles in microchannels" BioMEMS Resource Center, Center for Engineering in Medicine and Surgical Services, Massachusetts General Hospital, Nov. 27, 2007, PNAS, 18892-18897, vol. 104, No. 48.
Dicarlo "Inertial Microfluidics: High-Throughput Focusing and Separation of Cells and Particles" BioMEMS Resource Center, Center for Engineering in Medicine, Massachusetts General Hospital, Twelfth International Conference on Miniaturized Systems for Chemistry and Life Sciences, Oct. 12-16, 2008, San Diego, California, USA. 3 pages.
Miyake, Ryo, et al. "Investigation of sheath flow chambers for flow cytometers: Micro machined flow chamber with low pressure loss." JSME International Journal Series B Fluids and Thermal Engineering 40.1 (1997): 106-113.
*Inguran, LLC* v. *ABS Glob., Inc.*, W.D. Wis., Case: 17-cv-446-wmc, Filed Apr. 29, 2019, 61 pages.
Miyhake, Ryo, et al. "Flow cytometric analysis by using micromachined flow chamber." JSME International Journal Series B Fluids and Thermal Engineering 43.2 (2000): 219-224.
Shapiro et al., "Practical Flow Cytometry," Fourth Edition, New Jersey: John Wiley & Sons, 2003, 5 pages.
Johnson et al. "Sex preselection in rabbits: live births from X and Y sperm separated by DNA and cell sorting." Biology of Reproduction 41.2 (1989): 199-203.
Europe Patent Office, "Communication pursuant to Article 94(3) EPC", Examination Report mailed Aug. 12, 2025 in connection with EP4232601.
Japan Patent Office, "Notice of Reasons for Rejection," mailed Oct. 1, 2025 in connection with JP patent application 21883920.7.

\* cited by examiner

| Straw Label (Code) | Plate | Quantity | Identity | Previous Samples | Purity | Estimated Contamination | Genomics |
|---|---|---|---|---|---|---|---|
| EX1 | 1 | PASS | MISMATCH | 0 of 6 | MIXED | 0.05805 | REVIEW |
| EX2 | 1 | PASS | MISMATCH | 8 of 9 | MIXED | 0.4574 | REVIEW |
| EX3 | 1 | PASS | MISMATCH | 224 of 255 | MIXED | 0.0698 | REVIEW |
| EX4 | 1 | PASS | PASS | 32 of 32 | PASS | N/A | PASS |
| EX5 | 1 | PASS | PASS | 227 of 234 | PASS | N/A | PASS |
| EX6 | 1 | PASS | PASS | 120 of 126 | PASS | N/A | PASS |
| EX7 | 1 | PASS | PASS | 15 of 17 | PASS | N/A | PASS |

METHODS AND SYSTEMS FOR PROCESSING GENETIC SAMPLES TO DETERMINE IDENTITY OR DETECT CONTAMINATION

CROSS-REFERENCES TO RELATED APPLICATIONS

This application is a non-provisional and claims benefit of U.S. Provisional Application No. 63/094,750 filed Oct. 21, 2020, the specification(s) of which is/are incorporated herein in their entirety by reference.

BACKGROUND OF THE INVENTION

Field of the Invention

The present invention relates to methods for amplification, sequencing, and analyzing genetic samples, more particularly to methods and systems for processing genetic samples, e.g., sperm samples, for verifying or determining identity of the samples, detecting genetic contamination therein, and/or detecting mislabeling of samples.

Background Art

When preparing animal semen straws, it is possible to incorrectly label the straw or accidentally introduce unwanted genetic material. For example, samples may first be split into multiple aliquots, run through machines for sex-selection, and then subsequently recombined. It is possible during the recombination step, or other steps, to introduce contamination or mix samples from different bulls, resulting in a calf being born with the incorrect sire.

Existing methods for evaluating genetic purity in coin, soy, or other such samples (e.g., current microarray or chip assays) primarily focus on determining if an evaluated sample is of a sufficient purity or low enough contamination level to be usable for additional downstream analysis. Existing methods also functionally measure one allele per line and may only be able to identify the presence of the given lines in a sample. Without wishing to limit the present invention to any theory or mechanism, it is believed that these methods are generally insufficient for determining if a sample comprises only a desired set of genetic material.

However, it was surprisingly discovered that multiplex sequencing methods could be used to detect low levels of contamination in straw samples, such as levels of contamination as low as 1% (or less than 1%), 2%, 3%, 4%, 5%, etc. This was surprising, since multiplex sequencing methods generally rely on uniform samples and the straw samples are non-uniform since they contain dead sperm, UV-irradiated sperm, etc.

BRIEF SUMMARY OF THE INVENTION

The present invention features methods and systems for processing genetic samples, e.g., sperm samples (e.g., samples from semen straws). The methods and systems herein allow for the verification or determination of the identity of the sample. For example, the methods and systems herein allow for determining/confirming that the genetic content in the sample matches the reference animal (e.g., confirm or determine if there is a 100% genetic match). The methods and systems herein also test the purity of samples so as to detect possible mixtures or contamination. In certain embodiments, the methods and systems herein also feature steps for determining the identity of the contaminant or the origin of the genetic material (e.g., in the case of a mislabeled sample).

Without wishing to limit the present invention to any theory or mechanism, it is believed that the methods and systems herein are advantageous because they allow for easy, fast, and highly sensitive identity confirmation and/or detection of contamination. Multiplexing helps decrease the cost and help with uniformity.

The methods and systems herein help determine (to an extent) that a tested sample comprises only a desired set of genetic material. By determining genetic purity of the semen straws to such an extent, it is possible to ensure to a greater degree that the straws contain the sperm they claim, thus avoiding costly errors. Also, certain jurisdictions require high purity standards, and the methods herein can help ensure certain sperm straws can be sold.

As previously discussed, when preparing samples of genetic material, it is possible that the samples may be incorrectly labeled or that the labels may be incorrectly read. Further, mixing or contamination may occur when splitting or separating samples and later recombining the samples, or contamination may occur when processing genetic samples for genotyping. The methods and systems herein can be used to help address the aforementioned problems that may arise with respect to the processing, handling, and quality control of genetic material.

Without wishing to limit the present invention to any theory or mechanism, it is believed that the methods and systems herein are advantageous because they improve on existing methods that were directed to quality control of sequencing data sets, and the methods and systems herein are advantageous in the field of semen processing. Existing methods generally checked for contamination or sample switching in sequencing data to determine if the sequencing data was suitable. The present invention provides an approach that may identify contamination in the sequencing run to both confirm the identity of the sample being tested (e.g., determine if there is a match between the expected individual in the sample and the actual individual identified in sample), and identify any contamination in the genetic sample (e.g., semen straw), both of which are not provided by existing methods.

Briefly, the test sample, e.g., genetic sample (e.g., isolated or extracted DNA from the test sample), is subjected to amplification (e.g., PCR amplification) using a pool of SNP primer pairs, wherein each SNP primer pair flanks a unique locus that contains a single SNP defining a first allele and a second allele. The amplification (e.g., PCR amplification) produces amplicons for each SNP allele, thus generating a pool of SNP amplicons. The methods further comprise subjecting the pool of SNP amplicons to sequencing (e.g., next-generation sequencing (NGS)), wherein sequencing provides a nucleotide sequence for each amplicon in the pool of SNP amplicons.

The results from the sequencing are provided to an analysis system, e.g., a computer-based system for compiling and/or organizing and/or performing mathematical or statistical operations on the information obtained from sequencing. For example, the analysis system may calculate the frequency of the first allele and the second allele for each SNP. In certain embodiments, the system compares the sequences and/or allele frequencies for each SNP to the corresponding SNPs of at least one reference sequence (e.g., a library sequence, a sequence from a known individual, e.g., a known bull, etc.). A subset of the corresponding SNPs of the reference sequence (e.g., library sequence, sequence from a reference individual, e.g., known bull, etc.) are expected=homozygous SNPs. In certain embodiments, the method comprises calculating the frequency of a non-matching allele for each SNP in the test sample corresponding to each expected homozygous SNP in the reference sequence. In some embodiments, particular calculations are based on the frequency of a non-matching allele for each expected homozygous SNP and the number of SNPs with a particular frequency of non-matching alleles, allowing for the determination of a rate of contamination by one or more genetically distinct individuals. The analysis helps to detect a genetic match (e.g., confirm identity), to detect a mixture, to determine the identity of the genetic sample, and/or determine origin of contaminating material, etc.

The genetic samples referred to in methods and systems herein comprise sperm samples, e.g., sperm samples obtained from bulls. However, the present invention is not limited to sperm samples, nor is the present invention limited to samples obtained from bulls. As previously discussed, the sperm samples may be stored in straws. In certain embodiments, the sperm sample may comprise live sperm and sperm having been subjected to UV irradiation. In some embodiments, the sperm sample comprises live sperm and dead sperm. In some embodiments, the sperm sample has been subjected to a machine for determining the sex of animal.

The methods herein are described as automated, multiplex methods. However, the present invention is not limited to automated and multi-sample applications. Multiplex assays are well known to one of ordinary skill in the art, wherein at least 2 samples are subjected to the method simultaneously, e.g., at least 2, at least 6, at least 12, at least 24, at least 48, at least 96, etc. samples are subjected to the method simultaneously.

The methods described herein may feature additional steps where samples are re-tested to confirm results, e.g., a non-100% match sample or one labeled as a potential mixture may be retested to confirm it is contaminated (or a swap) instead of being automatically discarded. In certain embodiments, samples are discarded after having been tested at least twice and two or more times have shown to be a non-100% match.

The methods herein may also feature steps for analyzing the sample for quantity. In certain embodiments, if the sample is determined to have insufficient quantity, another sample may be obtained from the source (e.g., sperm straw).

The present invention also includes providing results from the amplification and sequencing to an integrated analysis system (e.g., application) with a user interface.

The analysis system (e.g., application) can display results via the user interface. Examples of results may include but are not limited to: SNP read results from sequencing, summaries of the sequencing results, errors or alerts, etc. For example, the analysis system may be programmed to show an alert (e.g., via the user interface) in certain circumstances, e.g., if there is insufficient genetic material for analysis, if there is suspected contamination, if there is not a genetic match, etc. The user (e.g., technician) may review the results and determine if a manual review of the data and/or a rerun of the sample is required based on the visual data shown on the user interface (e.g., the visual data showing the SNP read results from the sequencing).

The present invention provides a method of processing extracted DNA from a test sample. In certain embodiments, the method comprises subjecting the extracted DNA from the test sample to nucleotide amplification using a pool of SNP primer pairs, each SNP primer pair flanking a unique locus that contains a single target SNP defining a first allele and a second allele, the nucleotide amplification produces amplicons for each SNP primer pair generating a pool of SNP amplicons; subjecting the pool of SNP amplicons to sequencing to generate a nucleotide sequence for each amplicon in the pool; and calculating a frequency of the first allele and the second allele for each SNP. The frequencies of the first alleles and second alleles for each SNP may be compared. For example, in certain embodiments, the frequencies of the first alleles and the second alleles for each SNP in a subset of the target SNPs to a reference sequence, wherein the subset of target SNPs is a group of SNPs expected to be homozygous. If the frequencies of the first alleles and second alleles for each SNP in the subset of target SNPs are an exact match to the corresponding SNPs in the reference sequence, then the test sample is the same as that of the reference sequence, e.g., there is a genetic match. If the frequencies of the first alleles and second alleles for each SNP in the subset of SNPs are not exact matches to the corresponding SNPs in the reference sequence, then a frequency of non-matching alleles is calculated for the SNPs in the subset of SNPs (e.g., the SNPs of the subset that are not exact matches). If the frequency of the non-matching alleles for a particular SNP is above a predetermined threshold (e.g., a "non-matching threshold"), then the particular SNP is considered to be a contaminating SNP (e.g., a potential indication of a mixture or error). If the number of contaminating SNPs is above a predetermined threshold (e.g., a "contaminating SNP threshold"), then the sample is identified as contaminated (e.g., the sample is considered to be a potential mixture or contain errors). In some embodiments, the sample is determined to be a mislabeled sample or a swap.

The methods and systems herein allow for confirming the identity of the sample, determining the purity of the sample, detecting contamination in the sample, determining an origin of contamination in the sample, and/or determining if the sample has sufficient genetic material for analysis.

In some embodiments, the nucleotide amplification method is PCR amplification. In some embodiments, the sequencing method is next-generation sequencing (NGS). In certain embodiments, the nucleotide amplification step comprises a step to add adapter sequences and barcodes for next-generation sequencing.

In certain embodiments, the method further comprises using an analysis system for calculating the frequency of the first allele and the second allele for each SNP and comparing the frequencies of the first allele and second alleles for each SNP to that of the reference sequence or the group of reference sequences in a sequence library.

In certain embodiments, the test sample is a sperm sample. The sperm sample may have been subjected to a machine for determining the sex of animal and comprises live and dead sperm. The sperm sample may have been subjected to UV irradiation.

In some embodiments, if the frequencies of the first alleles and second alleles for each SNP in the subset of SNPs are an exact match to those same SNPs in the reference sequence, then the test sample is at least 98% pure. In some embodiments, if the frequencies of the first alleles and second alleles for each SNP in the subset of SNPs are an exact match to those same SNPs in the reference sequence, then the test sample is at least 99% pure. In some embodiments, if the frequencies of the first alleles and second alleles for each SNP in the subset of SNPs are an exact match to those same SNPs in the reference sequence, then the test sample is at least 99.5% pure.

In some embodiments, if the test sample has 1 or more contaminating SNPs, the test sample is identified as contaminated. In some embodiments, if the test sample has 2 or more contaminating SNPs, the test sample is identified as contaminated. In some embodiments, if the test sample has 3 or more contaminating SNPs, the test sample is identified as contaminated.

The method may be performed as a multiplex assay, e.g., wherein at least 2 samples are subjected to the method simultaneously, wherein at least 48 samples are subjected to the method simultaneously, wherein at least 96 samples are subjected to the method simultaneously, etc.

In certain embodiments, the primer pool comprises at least 48 primer sets (e.g., 48 primer sets, 49 primer sets, 50 or more primer sets, etc.). In certain embodiments, the primer pool comprises 24 or more primer sets, 30 or more, 36 or more 40 or more, 42 or more, 45 or more, etc.

The methods may further comprise analyzing the sample to ensure the sample has adequate quantity. In certain embodiments, if the sample has fewer than 40 reads for each SNP in the primer pool (or particular subset of SNPs), then the sample has insufficient genetic material for analysis. In certain embodiments, if the sample has fewer than 35 reads for each SNP in the primer pool (or particular subset of SNPs), then the sample has insufficient genetic material for analysis. In certain embodiments, if the sample has fewer than 30 reads for each SNP in the primer pool (or particular subset of SNPs), then the sample has insufficient genetic material for analysis. In certain embodiments, if the sample has fewer than 25 reads for each SNP in the primer pool (or particular subset of SNPs), then the sample has insufficient genetic material for analysis. In certain embodiments, if the sample has fewer than 20 reads for each SNP in the primer pool (or particular subset of SNPs), then the sample has insufficient genetic material for analysis. In certain embodiments, if the sample has fewer than 45 reads for each SNP in the primer pool (or particular subset of SNPs), then the sample has insufficient genetic material for analysis. In certain embodiments, if the sample has fewer than 50 reads for each SNP in the primer pool (or particular subset of SNPs), then the sample has insufficient genetic material for analysis. If the sample does not have sufficient DNA for analysis, another DNA sample may be obtained to be retested.

In certain embodiments, the frequencies of non-matching alleles for the SNPs in the subset of SNPs is calculated as a number from 0-1.

In certain embodiments, the predetermined non-matching threshold is 0.5%. In certain embodiments, the predetermined non-matching threshold is 1%. In certain embodiments, the predetermined non-matching threshold is 2%. In certain embodiments, the predetermined non-matching threshold is 5%. In certain embodiments, the predetermined non-matching threshold is 0.5%, 1%, 2%, or 5%.

In certain embodiments, if the sample has at least 5 of the SNPs in the subset of SNPs that are contaminating SNPs, then the sample is considered a contaminated sample. In certain embodiments, if at least 5% of the SNPs in the subset of SNPs are contaminating SNPs, then the sample is considered a contaminated sample. In certain embodiments, wherein if at least 10% of the SNPs in the subset of SNPs are contaminating SNPs, then the sample is considered a contaminated sample. In certain embodiments, wherein if at least 15% of the SNPs in the subset of SNPs are contaminating SNPs, then the sample is considered a contaminated sample.

The method may further comprise determining an origin of contamination in the test sample. Determining the origin of contamination in the test sample may comprise comparing the test sample to one or more alternative reference sequences, wherein the contamination may be traced to the one or more alterative reference sequences. In certain embodiments, the alternative reference sequence is one from a sequence library, a public database, and/or an industry database.

In certain embodiments, the allele frequencies for each SNP are calculated by counting the number of reads that contain each allele on a 0-0.5 scale, wherein the smaller allele is used in the numerator; wherein genotypes are called on a 0,1,2 scale, wherein 0 is homozygous according to the reference sequence and 2 is homozygous but opposite the reference sequence, and 1 is heterozygous; wherein if the allele frequency is greater than or equal to 0.2 then the genotype is 1 or heterozygous, if the allele frequency is <0.2 and the allele is the same as the reference sequence then the genotype is 0 or homozygous or if it is opposite the reference sequence then the genotype is 2.

The present invention also provides a method of processing extracted DNA from a test sample. In certain embodiments, the method comprises subjecting the extracted DNA from the test sample to PCR amplification using a pool of SNP primer pairs, each SNP primer pair flanking a unique locus that contains a single SNP defining a first allele and a second allele, the nucleotide amplification produces amplicons for each SNP primer pair generating a pool of SNP amplicons; subjecting the pool of SNP amplicons to next-generation sequencing (NGS) to generate a nucleotide sequence for each amplicon in the pool, each amplicon being either the first allele or the second allele of a SNP; and calculating allele frequencies for the first allele and the second allele for each SNP and comparing the allele frequencies for the first alleles and second alleles for each SNP in a subset of SNPs to those same SNPs in a reference sequence, the subset of SNPs is a group of SNPs expected to be homozygous. In certain embodiments, allele frequencies for each SNP are calculated by counting the number of reads that contain each allele on a 0-0.5 scale, wherein the smaller allele is used in the numerator; wherein genotypes are called on a 0,1,2 scale, wherein 0 is homozygous according to the reference sequence and 2 is homozygous but opposite the reference sequence, and 1 is heterozygous; wherein if the allele frequency is greater than or equal to 0.2 then the genotype is 1 or heterozygous, if the allele frequency is <0.2 and the allele is the same as the reference sequence then the genotype is 0 or homozygous or if it is opposite the reference sequence then the genotype is 2. In certain embodiments, if the frequencies of the first alleles and second alleles for each SNP in the subset of SNPs are an exact match to those same SNPs in the reference sequence, then the test sample is the same as that of the reference sequence and the sample is at least 95% pure. In certain embodiments, if the frequencies of the first alleles and second alleles for each SNP in the subset of SNPs are not exact matches, then a frequency of non-matching alleles is calculated, wherein if the frequency of the non-matching alleles is above a predetermined non-matching threshold then the SNP is a contaminating SNP, wherein the method further comprises calculating a number of contaminating SNPs in the test sample, wherein if the number of contaminating SNPs is above a predetermined contaminating SNP threshold, then the sample is identified as having a contamination.

As previously discussed, the methods and systems herein allow for confirming the identity of the sample, determining the purity of the sample, detecting contamination in the sample, determining an origin of contamination in the sample, and/or determining if the sample has sufficient genetic material for analysis. As such, the present invention provides a method of confirming the identity of a sample; a method of determining the purity of a sample; a method of detecting contamination in a sample; a method of determining the origin of contamination in the sample; and a method of determining if the sample has sufficient genetic material for analysis. These methods incorporate the aforementioned steps in the method of processing samples, e.g., subjecting the extracted DNA from the test sample to nucleotide amplification using a pool of SNP primer pairs (wherein each SNP primer pair flanks a unique locus that contains a single target SNP defining a first allele and a second allele, wherein the nucleotide amplification produces amplicons for each SNP primer pair generating a pool of SNP amplicons); subjecting the pool of SNP amplicons to sequencing to generate a nucleotide sequence for each amplicon in the pool; calculating a frequency of the first allele and the second allele for each SNP, etc.

As an example, the present invention provides a method of processing extracted DNA from a test sample for detecting a genetic match. In certain embodiments, the method comprises subjecting the extracted DNA from the test sample to nucleotide amplification using a pool of SNP primer pairs, each SNP primer pair flanking a unique locus that contains a single target SNP defining a first allele and a second allele, the nucleotide amplification produces amplicons for each SNP primer pair generating a pool of SNP amplicons; subjecting the pool of SNP amplicons to sequencing to generate a nucleotide sequence for each amplicon in the pool; and calculating a frequency of the first allele and the second allele for each SNP. The frequencies of the first alleles and second alleles for each SNP may be compared. For example, in certain embodiments, the frequencies of the first alleles and the second alleles for each SNP in a subset of the target SNPs to a reference sequence, wherein the subset of target SNPs is a group of SNPs expected to be homozygous. If the frequencies of the first alleles and second alleles for each SNP in the subset of target SNPs are an exact match to the corresponding SNPs in the reference sequence, then the test sample is the same as that of the reference sequence, e.g., there is a genetic match.

As another example, the present invention provides a method of processing extracted DNA from a test sample to detect possible contamination. In certain embodiments, the method comprises subjecting the extracted DNA from the test sample to nucleotide amplification using a pool of SNP primer pairs, each SNP primer pair flanking a unique locus that contains a single target SNP defining a first allele and a second allele, the nucleotide amplification produces amplicons for each SNP primer pair generating a pool of SNP amplicons; subjecting the pool of SNP amplicons to sequencing to generate a nucleotide sequence for each amplicon in the pool; and calculating a frequency of the first allele and the second allele for each SNP. The frequencies of the first alleles and second alleles for each SNP may be compared. For example, in certain embodiments, the frequencies of the first alleles and the second alleles for each SNP in a subset of the target SNPs to a reference sequence, wherein the subset of target SNPs is a group of SNPs expected to be homozygous. If the frequencies of the first alleles and second alleles for each SNP in the subset of SNPs are not exact matches to the corresponding SNPs in the reference sequence, then a frequency of non-matching alleles is calculated for the SNPs in the subset of SNPs (e.g., the SNPs of the subset that are not exact matches). If the frequency of the non-matching alleles for a particular SNP is above a predetermined threshold (e.g., a "non-matching threshold"), then the particular SNP is considered to be a contaminating SNP (e.g., a potential indication of a mixture or error), and if the number of contaminating SNPs is above a predetermined threshold (e.g., a "contaminating SNP threshold"), then the sample is identified as having a potential contamination (e.g., the sample is considered to be a potential mixture or contain errors).

The present invention also provides systems, e.g., a computer-implemented system, an analysis system, for performing the methods disclosed herein. For example, the systems may feature a processor (e.g., microprocessor) for performing mathematical and/or statistical and/or analytical operations for one or more steps in the methods disclosed herein. The processor (e.g., microprocessor) may be operatively connected to one or more other components of the system, e.g., a sequencing system, a user interface, etc.

The methods herein may be computer-implemented methods.

With respect to the methods disclosed herein, the methods may further comprise additional steps related to the sale and/or use of the samples from which the test samples are derived, e.g., the semen straws from which the test samples were derived. In certain embodiments, the methods further comprise "approving" or "passing" a sample wherein there is a genetic match, e.g., labeling the sample in some way to indicate that the sample may be used and/or sold. In certain embodiments, the methods further comprise providing an approved (passed) sample for sale and/or use. In certain embodiments, the methods further comprise retesting the sample if it is considered to be possibly contaminated. In certain embodiments, the methods further comprise "failing" a sample wherein there is a contaminant or error, e.g., labeling the sample in some way to indicate that the sample may not be used and/or sold. In certain embodiments, the methods further comprise destroying the sample from which the test sample is derived if the sample is determined to be contaminated.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

Figure 2:
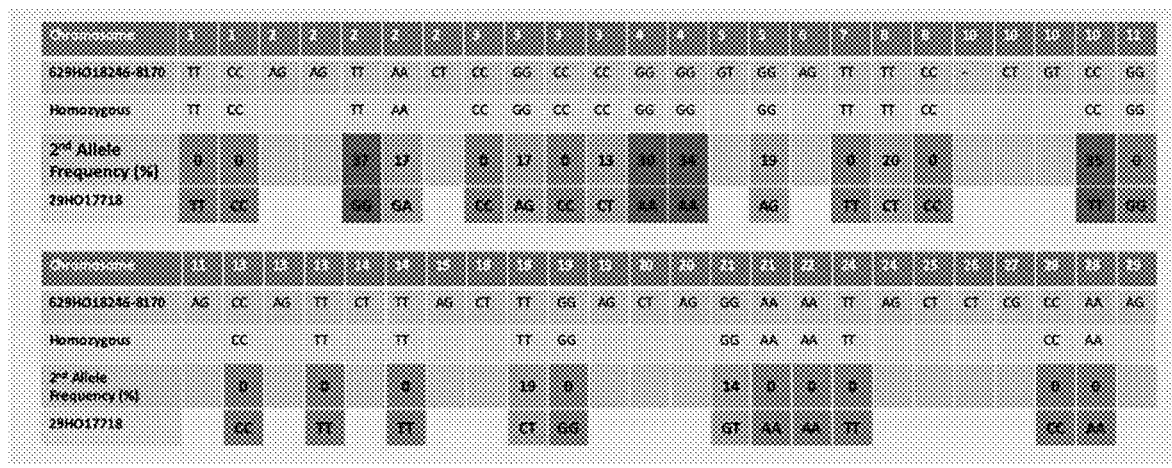

FIG. 2 shows an example of the second allele frequencies for particular SNPs expected to be homozygous in a real sample with a contaminating bull. There are three categories of SNPs: "0" represents 0 copies of the second allele; the dark grey boxes (with numbers 37, 30, 34, and 35) represent 2 copies of the second allele, and the remaining numbered boxes (with numbers 17, 17, 13, 19, 20, 19, and 14) represent one copy of the second allele. This serves as a fingerprint for identifying the contaminating bull. For example, bull 29HO17718 is the only bull in the group with that particular genotype.

Figure 3A:
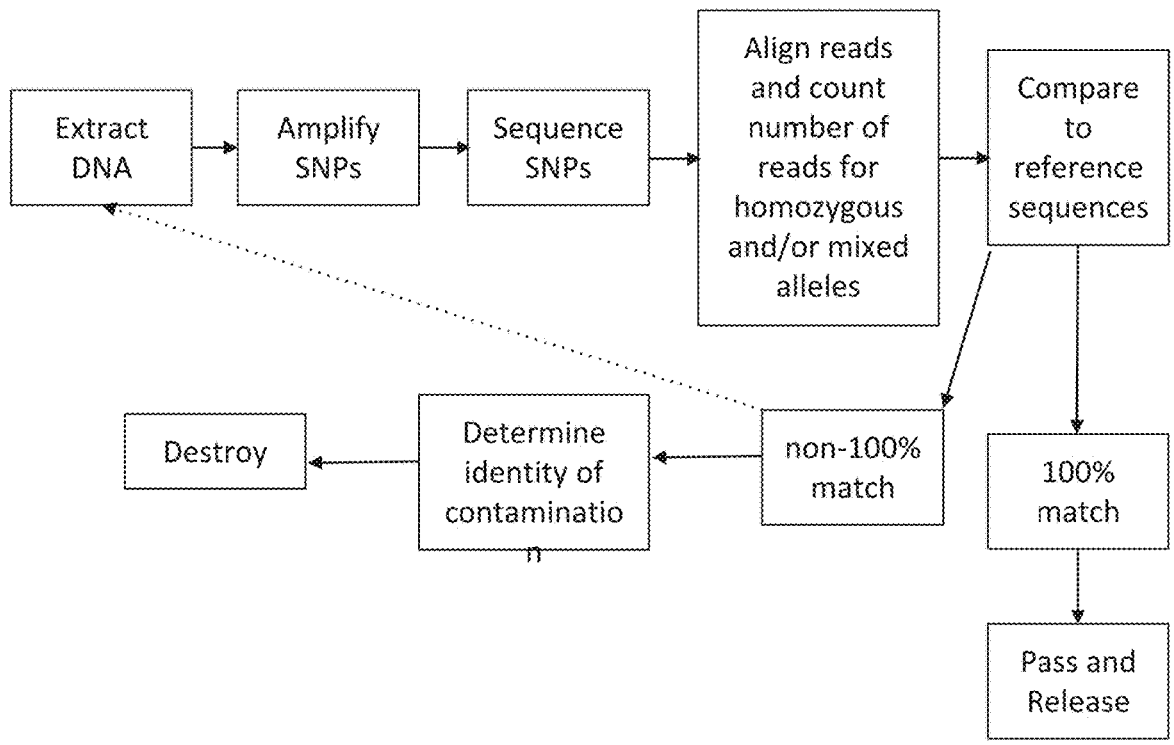

FIG. 3A shows a schematic of a workflow related to the methods of the present invention. The present invention is not limited to the workflow in FIG. 3A. Note that samples that are non-100% matches may be subject to retesting before being destroyed.

Figure 3B:
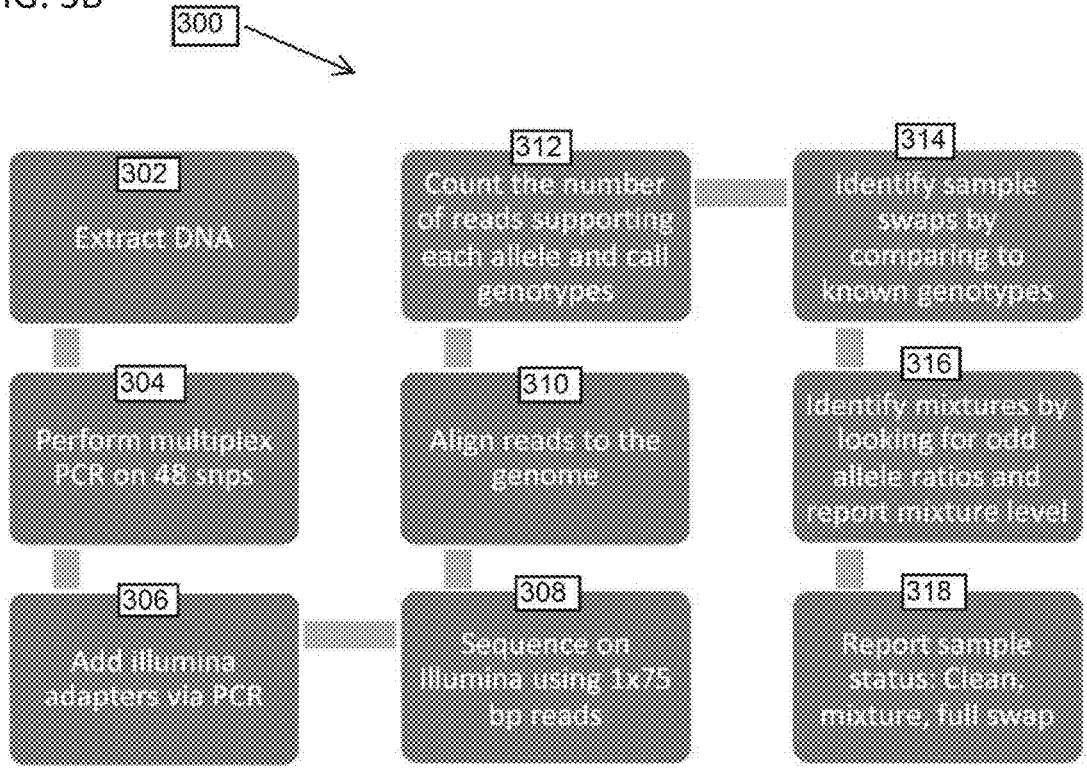

FIG. 3B shows a schematic of a workflow related to the methods of the present invention. The present invention is not limited to the workflow in FIG. 3B.

Figures 4, 5:
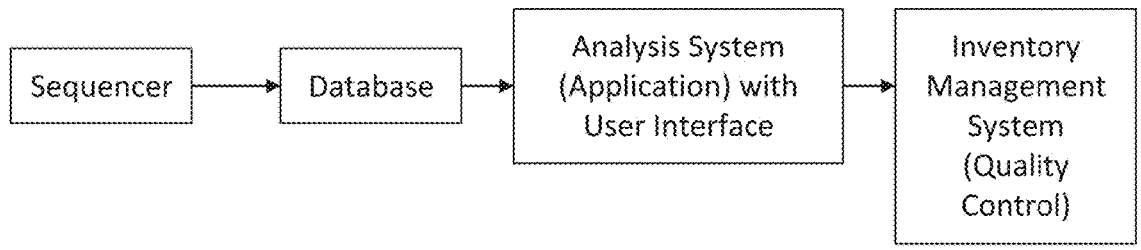

FIG. 4 shows a schematic of a workflow related to the methods of the present invention, wherein the sequencing data is stored in a database that is integrated or operatively connected to an analysis system with a user interface. The user interface allows for review and quality control of the samples.

FIG. 5 shows a non-limiting example of output data for a group of hypothetical straw samples.

DETAILED DESCRIPTION OF THE INVENTION

The present invention features methods and systems for processing genetic samples and testing the purity of samples (e.g., semen straws), e.g., for detecting a suspected mixture or contamination, for detecting the mislabeling of a sample (e.g., sample swap), for confirming the identity of a sample, for determining the identity (origin) of the sample, for determining the identity (origin) of contamination, if any, etc.

The methods for processing the genetic samples herein feature amplifying particular regions of extracted DNA from test samples (e.g., sperm sample, e.g., sperm samples derived from semen straws), sequencing the amplicons, and analyzing the amplicons.

Samples may be provided to a user as extracted DNA. Alternatively, one of ordinary skill in the art understands that in the case of a raw sample, an additional step of DNA extraction may be performed before further processing.

Amplification and Sequencing of Amplicons

Referring to the methods and systems herein, the genetic samples (e.g., extracted DNA) are subjected to amplification (e.g., PCR amplification), wherein the amplification step produces amplicons of specific SNPs. Methods of DNA amplification are well known to one of ordinary skill in the art. For example, amplification may refer to but is not limited to PCR amplification. Sets of SNP primer pairs, wherein each SNP primer pair flank a unique locus (a target SNP), thus defining a first allele and a second allele, are used as primers during amplification.

In certain embodiments, the primer pool comprises at least 24 primer sets (for amplification of 24 target SNPs). In some embodiments, the primer pool comprises at least 36 primer sets (for amplification of 36 target SNPs). In some embodiments, the primer pool comprises at least 40 primer sets (for amplification of 40 target SNPs). In some embodiments, the primer pool comprises at least 48 primer sets (for amplification of 48 target SNPs). In some embodiments, the primer pool comprises 48 primer sets. In some embodiments, the primer pool comprises 49 primer sets. In some embodiments, the primer pool comprises 50 primer sets. In some embodiments, the primer pool comprises 24 to 48 primer sets. In some embodiments, the primer pool comprises 40 to 50 primer sets. In some embodiments, the primer pool comprises 48 or 49 primer sets. In some embodiments, the primer pool comprises 50 to 60 primer sets. In some embodiments, the primer pool comprises more than 50 primer sets.

In certain embodiments, at least 10 of the target SNPs are expected to be homozygous. In certain embodiments, at least 15 of the target SNPs are expected to be homozygous. In certain embodiments, at least 20 of the target SNPs are expected to be homozygous. In certain embodiments, at least 25 of the target SNPs are expected to be homozygous. In certain embodiments, at least 30 of the target SNPs are expected to be homozygous. In certain embodiments, at least 35 of the target SNPs are expected to be homozygous. In certain embodiments, at least 10% of the target SNPs are expected to be homozygous. In certain embodiments, at least 20% of the target SNPs are expected to be homozygous. In certain embodiments, at least 25% of the target SNPs are expected to be homozygous. In certain embodiments, at least 30% of the target SNPs are expected to be homozygous. In certain embodiments, at least 40% of the target SNPs are expected to be homozygous. In certain embodiments, at least 50% of the target SNPs are expected to be homozygous. In certain embodiments, at least 60% of the target SNPs are expected to be homozygous. In certain embodiments, at least 70% of the target SNPs are expected to be homozygous. In certain embodiments, at least 75% of the target SNPs are expected to be homozygous. In certain embodiments, all of the target SNPs are expected to be homozygous.

Examples of primer pairs used in the methods of the present invention are described below in Table 1. It is to be understood that the primers disclosed herein are provided as an example only, and the present invention is not limited to the primers nor the SNPs disclosed herein. Based on the disclosure of the present invention, one of ordinary skill in the art would be capable of selecting other SNPs and designing primers for said selected SNPs. Likewise, the present invention is not limited to testing of sperm samples in bulls; the methods and systems herein may be applied to other sample types and other species (e.g., other mammals).

TABLE 1

| Primer pair | SEQ ID NO: | Sequence | Chromosome |
|---|---|---|---|
| 1 | 1 | TTTCCTTCTGTAGATGTTAACTGGT | 5 |
|   | 2 | ACGGACAATAAACTGTAAATTTC |   |
| 2 | 3 | CACTTGTATGTATTTCAGAAGTTTTC | 25 |
|   | 4 | AGGATCACAAACAATGCCCT |   |
| 3 | 5 | TCTGAAGGAATTGAAAATGTCTACCA | 20 |
|   | 6 | ACTTCTACAATTAGCGATTAACTG |   |
| 4 | 7 | TCAGAGGAGAATGTCTAGTTTAGA | 14 |
|   | 8 | TCAGTGTGACGGAGCTGC |   |
| 5 | 9 | TCATGAGAAATCAGCCCACA | 27 |
|   | 10 | ACCTGCTGTGTAATGTATTTAAAC |   |
| 6 | 11 | AGGTTTAAGGGAATATTTGCACCT | 19 |
|   | 12 | TTTGAATAACTGTACAGGGAATTC |   |

TABLE 1-continued

| Primer pair | SEQ ID NO: | Sequence | Chromosome |
|---|---|---|---|
| 7 | 13 | GCTTAAAGTTCTAAACCAATCAACA | 1 |
|  | 14 | AGCTCTTCTAAAACAAGTAAAGCCA |  |
| 8 | 15 | CCAAGAACCACTGTGATAGGAG | 22 |
|  | 16 | TAAGAAAAGAGGGAACAAGACT |  |
| 9 | 17 | ATGTGGCTTCCTGTATTCCCT | 13 |
|  | 18 | GTTCAGCAAATAATTTATAGAGAACC |  |
| 10 | 19 | CTGGCCCAAACTCATCACAC | 8 |
|  | 20 | ACAAACCAACCACCAAACAGA |  |
| 11 | 21 | TGAGTTTCAGAGAGGGCCAG | 3 |
|  | 22 | GCCACTTGATGCCATAGGTC |  |
| 12 | 23 | AGAAAGCCATACCCAGGGAG | 11 |
|  | 24 | AGACAACAGTGAAGTTCAGGC |  |
| 13 | 25 | CCCATGTATGTGTAGCTGGC | 4 |
|  | 26 | CTGAGGAAGACAGGGAGAAGG |  |
| 14 | 27 | ACATAAGTACATATCTACTGGCCT | 2 |
|  | 28 | TGAGAACCACTTAAGATAGGGT |  |
| 15 | 29 | TACTAATTGTATATCTTGCTGCTCAG | 3 |
|  | 30 | CTGCCTTCCCTCCTCAGTC |  |
| 16 | 31 | AGGTATTATGAGTTGTGTGGGT | 4 |
|  | 32 | ACATCCTCTTACCTAATCTGAGCT |  |
| 17 | 33 | GGAAACCCTATGAGCCAGAGT | 6 |
|  | 34 | TCCCTCAGCCCCTTTCAG |  |
| 18 | 35 | GGGAGTGGAGAGTGGATTGG | 13 |
|  | 36 | TGCCCCTTTTGTACAGATGG |  |
| 19 | 37 | ATTCTCTTGACTTGCAGGCG | 29 |
|  | 38 | GTCAATAACTCAATAAAAGCACTGA |  |
| 20 | 39 | TGGGTTCTTGGGTCCAGAG | 18 |
|  | 40 | AGGTCCCAGTCTCCTCCTTC |  |
| 21 | 41 | GACTGCCTGGATCTGAGAGG | 19 |
|  | 42 | CAACGGGACACTTGCCTTTC |  |
| 22 | 43 | ATGTCTAGCCCTCACTCCCA | 24 |
|  | 44 | CGTGATCAAGGCAGAACTACA |  |
| 23 | 45 | AAGAGCAGCTGGTTTCCTAT | 2 |
|  | 46 | AGGGGAGAAGATATGCAGACAG |  |
| 24 | 47 | GTCCTCATCAGCCTCGTCAT | 2 |
|  | 48 | ATATCCACCCTGCAAACCCA |  |
| 25 | 49 | AGTGCTATCATGTGCCTTGA | 3 |
|  | 50 | ACACAGACTTTAAAGCAGCCT |  |
| 26 | 51 | GAGGGGAGGGGAGGGTTG | 5 |
|  | 52 | GAGAATTCAGGGGCCCTTCT |  |
| 27 | 53 | GGATAATCTTTAGCAATCAGAGGC | 7 |
|  | 54 | TCTCCCCGCTTGTAACAGTT |  |
| 28 | 55 | AAAACTTGCTGCCAGGGAA | 2 |
|  | 56 | CACGAGGCACATATCAGT |  |
| 29 | 57 | CCTGTTACCTGGGCTTCATG | 10 |
|  | 58 | ACGACTCGGCATAGATGATTTG |  |
| 30 | 59 | CCTCTCTTTCAGGCCAAAATCC | 8 |
|  | 60 | CTATTCTATTTTCCTCAAGTATCTGC |  |
| 31 | 61 | ATTCAGATTGATGGTCCAGCA | 15 |
|  | 62 | AGTGGTGATCTCAAAGAGGCT |  |
| 32 | 63 | TAACTGCATCGTTAAACTGGCT | 20 |
|  | 64 | CTTCTGGAGCTCACCCACC |  |
| 33 | 65 | CACTCAGACGTCCCCAACC | 10 |
|  | 66 | GGGTTCGGCAAGATTCAAGT |  |
| 34 | 67 | GAGGCTGCCAGGTGTCAC | 24 |
|  | 68 | TGAAAAGGTAGCCCAGGTGT |  |
| 35 | 69 | GTTTTGCCTTCCACCCACC | 13 |
|  | 70 | TCTCCAAAGCAAACAAGTTAGTG |  |
| 36 | 71 | CCAACCTGTTCAGCACA | 26 |
|  | 72 | AGATCTTCCCCAACAGTACT |  |
| 37 | 73 | GGAAGTCCCTTGTGCTCATC | 21 |
|  | 74 | AAGTAGACCACGCCCCTTTC |  |
| 38 | 75 | AAAGTAATAAGGCTTGCCTTCCA | 2 |
|  | 76 | TGAGAAATATTGACTACACGCCC |  |
| 39 | 77 | AAGGGGCTCATAAGATAAAGC | 1 |
|  | 78 | CCAGAGATGGGGCATAGAACT |  |
| 40 | 79 | GTGCCTGGCTCTGTACA | 3 |
|  | 80 | TGCCGACCTCACGTGG |  |
| 41 | 81 | GTCCATCCATGTTGCTGCAA | 10 |
|  | 82 | TACTGGCCAAGAACACCT |  |
| 42 | 83 | ATTATGTTTTAATGCACTGCTGT | 11 |
|  | 84 | TTGGCATTGGGAAAGGGAAA |  |
| 43 | 85 | TGTGGGTTGTAGTAGCAGCA | 14 |
|  | 86 | ACCCAGTCACATTCAGAGCT |  |
| 44 | 87 | ACTAAAATACAAATGCAGGCAC | 10 |
|  | 88 | GGTACCCTGTATTCTTTCAAATGAGT |  |
| 45 | 89 | TGCTGCAGATTCTTTACTTGCT | 21 |
|  | 90 | TCTCTAGCCCATGTCATGACT |  |
| 46 | 91 | TCTTTTCATCCTTACCATAGCTAGG | 28 |
|  | 92 | TTGCAGATGTGATCAAGGCT |  |
| 47 | 93 | AGGATTGTATTTAAGGTTGTCTGA | 18 |
|  | 94 | TGATGCCCACAATACCAGGT |  |
| 48 | 95 | CAGGCAGATGGTTTTAACACAC | 28 |
|  | 96 | AGATAATATAGACTGTAGTGCTGGGT |  |

The primer pairs allow for amplification of specific SNPs, wherein at least a subset of the SNPs can help determine the identity and purity of the test sample.

The pool of SNP amplicons resulting from the amplification step are further subjected to sequencing. Methods of sequencing, such as but not limited to next-generation sequencing (NGS), are well known to one of ordinary skill in the art. Additional steps in the method may include attachment of adapter sequences for NGS.

Analysis

The results from the sequencing are provided to an analysis system, e.g., an application, e.g., a computer-based system for compiling and/or organizing and/or performing mathematical or statistical operations on the information obtained from sequencing. For example, the analysis system may calculate the frequency of the first allele and the second allele for each SNP. As is described herein, the analysis system compares the sequences and/or allele frequencies for each SNP to the corresponding SNPs of at least one reference sequence (e.g., a library sequence, a sequence from a known individual, e.g., a known bull, etc.). A subset of the corresponding SNPs of the reference sequence (e.g., library sequence, sequence from a reference individual, e.g., known bull, etc.) are homozygous SNPs. In certain embodiments, the method comprises calculating the frequency of a non-matching allele for each SNP in the test sample corresponding to each expected homozygous SNP in the reference sequence. In some embodiments, particular calculations are based on the frequency of a non-matching allele for each expected homozygous SNP and the number of SNPs with a particular frequency of non-matching alleles, allowing for the determination of a rate of contamination by one or more genetically distinct individuals. The analysis helps to detect a genetic match (e.g., confirm identity), to determine the identity of the genetic sample, detect a potential mixture, and/or determine origin of contaminating material, etc.

In some embodiments, the methods and systems feature a step that checks the quantity of the DNA in the sample to determine if there is enough genetic material amplified and sequenced so as to be properly analyzed. If there is not enough DNA for proper analysis, the system may produce an error signal, e.g., "LOW" signal. In certain embodiments, DNA extraction is repeated.

With respect to the quantity of the sample, the analysis system may calculate the frequencies of all target SNPs or a particular subset of SNPs (e.g., the subset of SNPs expected to be homozygous, etc.). The methods and systems may require a certain number of reads for each of the SNPs in the predetermined subset of SNPs (or all target SNPs if the system uses all for quantity analysis). For example, in certain embodiments, the methods and systems require at least 40 reads of each SNP (or a subset of the SNPs). In certain embodiments, at least 35 reads of each SNP (or a subset of the SNPs). In certain embodiments, at least 30 reads of each SNP (or a subset of the SNPs). In certain embodiments, at least 25 reads of each SNP (or a subset of the SNPs). In certain embodiments, at least 20 reads of each SNP (or a subset of the SNPs). In certain embodiments, at least 45 reads of each SNP (or a subset of the SNPs). In certain embodiments, at least 50 reads of each SNP (or a subset of the SNPs). The present invention is not limited to the aforementioned SNP requirements.

In certain embodiments, the subset of SNPs used for the quantity analysis comprises 5 or more SNPs. In certain embodiments, the subset of SNPs used for the quantity analysis comprises 10 or more SNPs. In certain embodiments, the subset of SNPs used for the quantity analysis comprises 15 or more SNPs. In certain embodiments, the subset of SNPs used for the quantity analysis comprises 20 or more SNPs. In certain embodiments, the subset of SNPs used for the quantity analysis comprises 25 or more SNPs. In certain embodiments, the subset of SNPs used for the quantity analysis comprises 30 or more SNPs. In certain embodiments, the subset of SNPs used for the quantity analysis comprises 35 or more SNPs. In certain embodiments, the subset of SNPs used for the quantity analysis comprises 40 or more SNPs. In certain embodiments, the subset of SNPs used for the quantity analysis comprises all of the target SNPs. In certain embodiments, the subset of SNPs used for the quantity analysis is all of the SNPs expected to be homozygous.

The overall composition of SNPs and their ratios, relative to a defined standard (e.g., sequence library, reference sequences, etc.), allows for testing for identity and an estimation of a degree of contamination by one or more genetically distinct individuals, if applicable.

The analysis system is configured to calculate the frequencies of the alleles for each SNP (or at least a subset of SNPs such as a subset of SNPs expected to be homozygous). For example, the analysis system is configured to calculate the frequency of the second allele (non-matching allele) for the target SNPs expected to be homozygous. The purity analysis portion of the methods herein relies on a reference genotype and focuses on the SNPs that should be homozygous in the expected genotype. If the SNP should be homozygous, detection of the other allele (second allele, non-matching allele) for that SNP in the sample would be unexpected (or at least detection of a large amount of the other allele would be unexpected, since a certain level of noise is typical with sequencing). Thus, the frequency of the other allele should be below a particular predetermined threshold (e.g., a non-matching allele frequency threshold, as described below).

Allele frequencies may be represented as a percentage, as a number from 0-1, etc. For example, if there are no second alleles detected for a particular expected-homozygous SNP, the allele frequency may be represented as 0. Detection of the second allele may result in allele frequencies greater than 0 (and up to 1), if using a scale from 0-1, such as 0.03, 0.05, 0.1, 0.18, 0.3, etc.

As previously discussed, the analysis system may use a second allele (or non-matching allele) frequency threshold, wherein detection of a non-matching allele frequency at and/or above the predetermined threshold indicates the SNP is a "contaminating" SNP. In certain embodiments, a non-matching allele frequency greater than 0 is indicative of a contaminating SNP. In other words, in some embodiments, the non-matching allele frequency threshold may be anything greater than 0. In certain embodiments, the non-matching allele frequency threshold (e.g., the frequency of the second allele that would indicate that the SNP is a contaminating SNP) is 0.005, or 0.5%. In certain embodiments, the non-matching allele frequency threshold (e.g., the frequency of the second allele that would indicate that the SNP is a contaminating SNP) is 0.01, or 1%. In certain embodiments, the non-matching allele frequency threshold (e.g., the frequency of the second allele that would indicate that the SNP is a contaminating SNP) is 0.02, or 2%. In certain embodiments, the non-matching allele frequency threshold (e.g., the frequency of the second allele that would indicate that the SNP is a contaminating SNP) is 0.03, or 3%. In certain embodiments, the non-matching allele frequency threshold (e.g., the frequency of the second allele that would indicate that the SNP is a contaminating SNP) is 0.04, or 4%. In certain embodiments, the non-matching allele frequency threshold (e.g., the frequency of the second allele that would indicate that the SNP is a contaminating SNP) is 0.05, or 5%.

The purity check generally uses the homozygote called genotype from a sample to classify the sample as having a mixture. For example, in some embodiments, clean homozygotes are expected to have a (maf<0.02), and clean heterozygotes are expected to have a (maf>0.4). A mixture may be a SNP called homozygote with a (0.02<maf<0.4).

The detection of a certain number of contaminating SNPs above a predetermined threshold is indicative of a mixture or possible mixture (e.g., genetic contamination) in the sample. For example, detection of 1 or more contaminating SNPs is indicative of a mixture (e.g., genetic contamination) in the sample. In some embodiments, 2 or more contaminating SNPs is indicative of a mixture (e.g., genetic contamination) in the sample. In some embodiments, 3 or more contaminating SNPs is indicative of a mixture (e.g., genetic contamination) in the sample. In some embodiments, 4 or more contaminating SNPs is indicative of a mixture (e.g., genetic contamination) in the sample. In some embodiments, 5 or more contaminating SNPs is indicative of a mixture (e.g., genetic contamination) in the sample. In some embodiments, 6 or more contaminating SNPs is indicative of a mixture (e.g., genetic contamination) in the sample. In some embodiments, 7 or more contaminating SNPs is indicative of a mixture (e.g., genetic contamination) in the sample. In certain embodiments, a sample wherein at least 1% of the expected-homozygous SNPs are marked as contaminating SNPs is considered a mixed or contaminated sample. In certain embodiments, a sample wherein at least 2% of the expected-homozygous SNPs are marked as contaminating SNPs is considered a mixed or contaminated sample. In certain embodiments, a sample wherein at least 3% of the expected-homozygous SNPs are marked as contaminating SNPs is considered a mixed or contaminated sample. In certain embodiments, a sample wherein at least 4% of the expected-homozygous SNPs are marked as contaminating SNPs is considered a mixed or contaminated sample. In certain embodiments, a sample wherein at least 5% of the expected-homozygous SNPs are marked as contaminating SNPs is considered a mixed or contaminated sample. In certain embodiments, a sample wherein at least 10% of the expected-homozygous SNPs are marked as contaminating SNPs is considered a mixed or contaminated sample. In certain embodiments, a sample wherein at least 15% of the expected-homozygous SNPs are marked as contaminating SNPs is considered a mixed or contaminated sample. In certain embodiments, a sample wherein at least 20% of the expected-homozygous SNPs are marked as contaminating SNPs is considered a mixed or contaminated sample. In certain embodiments, a sample wherein at least 25% of the expected-homozygous SNPs are marked as contaminating SNPs is considered a mixed or contaminated sample.

In certain embodiments, purity (or amount of contamination) is reported by taking the median of the 3 highest frequency SNPs. In certain embodiments, purity (or amount of contamination) is reported by taking the median of the 4 highest frequency SNPs. In certain embodiments, purity (or amount of contamination) is reported by taking the median of the 3 highest frequency SNPs. In certain embodiments, purity (or amount of contamination) is reported by taking the median of the 5 highest frequency SNPs. The present invention is not limited to the aforementioned method of reporting purity or amount of contamination.

In certain embodiments, a contaminated sample is one that has a median frequency of the highest three contaminating SNPs greater than 5%. In certain embodiments, a contaminated sample may be one that has a median frequency of the highest three contaminating SNPs greater than 10%. In certain embodiments, a contaminated sample may be one that has a median frequency of the highest three contaminating SNPs greater than 15%. In certain embodiments, a contaminated sample may be one that has a median frequency of the highest three contaminating SNPs greater than 20%. In certain embodiments, a contaminated sample may be one that has a median frequency of the highest three contaminating SNPs greater than 25%.

In some embodiments, the amount of contamination in the sample is 1% or less. In some embodiments, the amount of contamination in the sample is 2% or less. In some embodiments, the amount of contamination in the sample is 3% or less. In some embodiments, the amount of contamination in the sample is 4% or less. In some embodiments, the amount of contamination in the sample is 5% or less. In some embodiments, the amount of contamination in the sample is 1-2% or less. In some embodiments, the amount of contamination in the sample is 2-3% or less. In some embodiments, the amount of contamination in the sample is 2-4% or less. In some embodiments, the amount of contamination in the sample is 2-5% or less. In some embodiments, the amount of contamination in the sample is 5-10% or less. In some embodiments, the amount of contamination in the sample is 2-15% or less. In some embodiments, the amount of contamination in the sample is 1% or more. In some embodiments, the amount of contamination in the sample is 2% or more. In some embodiments, the amount of contamination in the sample is 3% or more. In some embodiments, the amount of contamination in the sample is 5% or more.

As a non-limiting example, in certain embodiments, at least 20% of the expected-homozygous SNPs must have a level of contamination of at least 1% to cause the sample to be flagged as contaminated. In certain embodiments, at least 10% of the expected-homozygous SNPs must have a level of contamination of at least 1% to cause the sample to be flagged as contaminated. In certain embodiments, at least 20% of the expected-homozygous SNPs must have a level of contamination of at least 2% to cause the sample to be flagged as contaminated. In certain embodiments, at least 10% of the expected-homozygous SNPs must have a level of contamination of at least 2% to cause the sample to be flagged as contaminated. In certain embodiments, at least 20% of the expected-homozygous SNPs must have a level of contamination of at least 3% to cause the sample to be flagged as contaminated. In certain embodiments, at least 10% of the expected-homozygous SNPs must have a level of contamination of at least 3% to cause the sample to be flagged as contaminated.

As previously discussed, calculation of the second allele frequencies (or non-matching allele frequencies) allows the sample to be tested for identity, to confirm whether the semen is from the correct animal, to determine the animal from which it originated, to identify a sample swap, to identify the origin of contamination, etc.

With respect to testing for identity, the genotype in the sample may be determined by checking against reference sequences, such as but not limited to the Council on Dairy Cattle Breeding (CDCB) database. If the sample has the expected genotype (e.g., if all of the expected-homozygous SNPs match those of the expected genotype), the sample may pass. If not, the sample may be checked against a previously sequenced genotype (a stand-in reference) such as but not limited to previously sequenced samples in the laboratory (previous QC samples), other industry samples, historical samples, etc. (e.g., a public database, though some animals may not be in a public database). If the sample is the reference sequence used as the stand-in reference, the sample may pass. If the sample does not pass, it may be subjected to further analysis and/or testing.

The methods and systems may be able to identify the combinations of individuals in a mixed test sample based on the sequences in a sequence library (e.g., animal #1 plus animal #2, animal #1 plus animal #2 plus animal #3, etc.). In certain embodiments, the sample may be determined to be a sample swap or a mislabeling.

The present invention is not limited to the aforementioned parameters or combinations of parameters that are used to calculate the level of contamination in the sample. Generally, the overall composition of SNPs and their ratios, relative to the defined standard, allows an estimation of the degree of contamination by one, or more, genetically distinct individuals. Final results may take on the form of number of mismatches, whether or not the sample is a sample swap, a percentage of mixture, a percentage of contamination, a list of potential contaminants, etc. Other results may include the allele frequencies for each SNP. As previously discussed, identification of a contaminated sample or mixture can result in the re-testing of a sample. The sample may then be determined to be pure. Inaccuracies with respect to the purity (e.g., pure sample, mixed sample) may be due to a variety of circumstances such as but not limited to errors in the sequencing process, contamination by a technician during sample preparation, etc.

In certain embodiments, the identity of the contaminant is determined. For example, a search may be run against reference genotypes, e.g., reference genotypes of samples with high likelihood of being the contaminant. In some embodiments, a contaminant may be identified by comparing the results to all the sequences within that day's sequencing run.

As previously discussed, the DNA sequences of the SNPs in the sample may be compared to one or more reference sequences. In certain embodiments, the reference sequence is a sequence in a sequence library. In certain embodiments, the reference sequence is one or more sequences of a group of bulls, e.g., a bull matching the sperm sample being tested, bulls not matching the sperm sample being tested, bulls that may be responsible for contamination of the sperm sample in the straw, bulls in a particular group or cohort, etc. For example, a reference library may comprise the sequences (each with its own unique SNP profile) from a group of bulls. As previously discussed, comparisons with reference sequences may help to confirm the identity of the sample, identify which bull the sperm sample belongs to, and/or which bull is the origin of the contamination, if any.

Figure 1A:
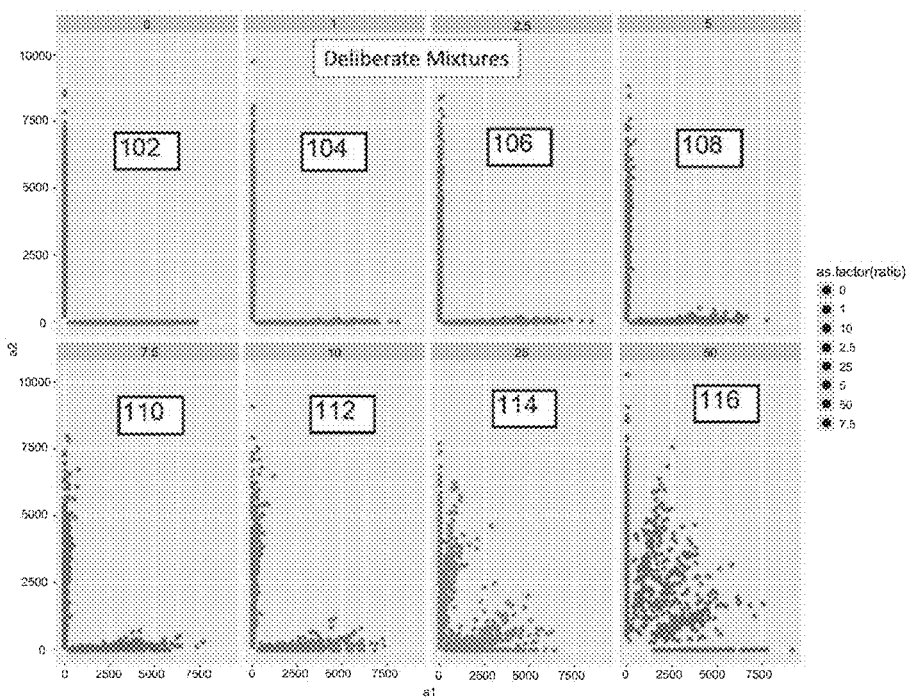
FIG. 1A shows the results from a series of deliberate mixtures.
Figure 1B:
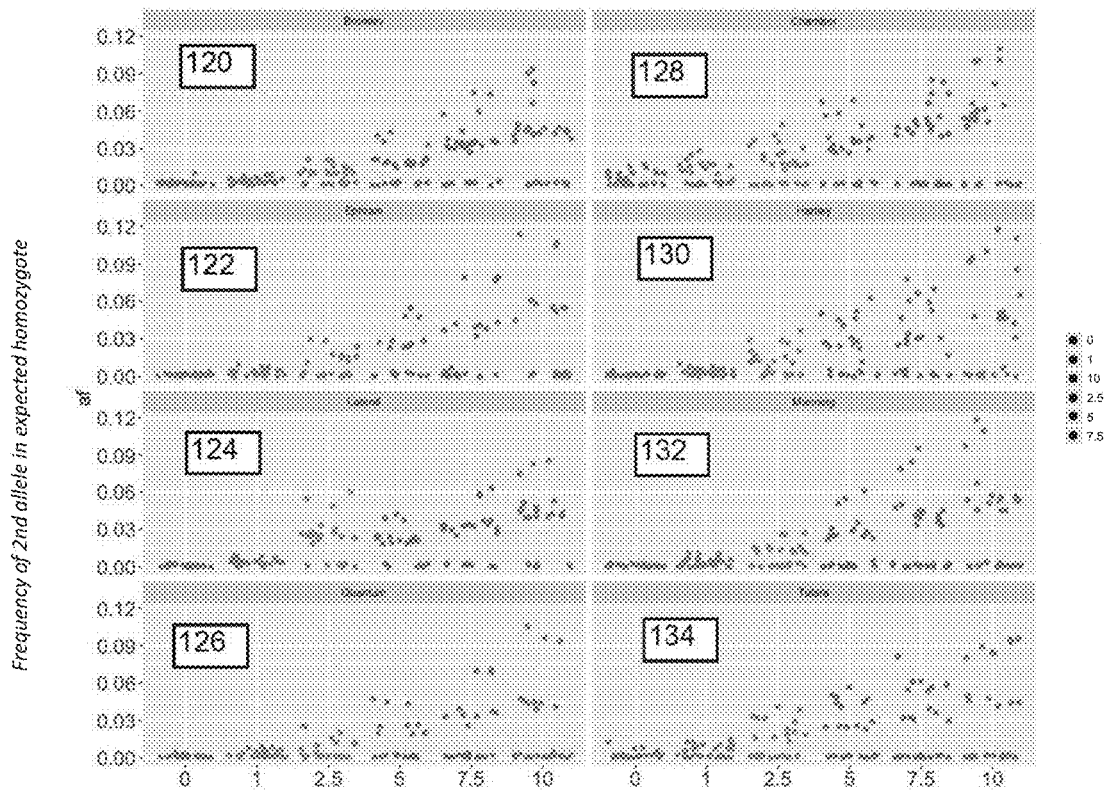
FIG. 1B shows the frequency of the second allele for a single-nucleotide polymorphism (SNP) expected to be homozygous.
Figure 1C:
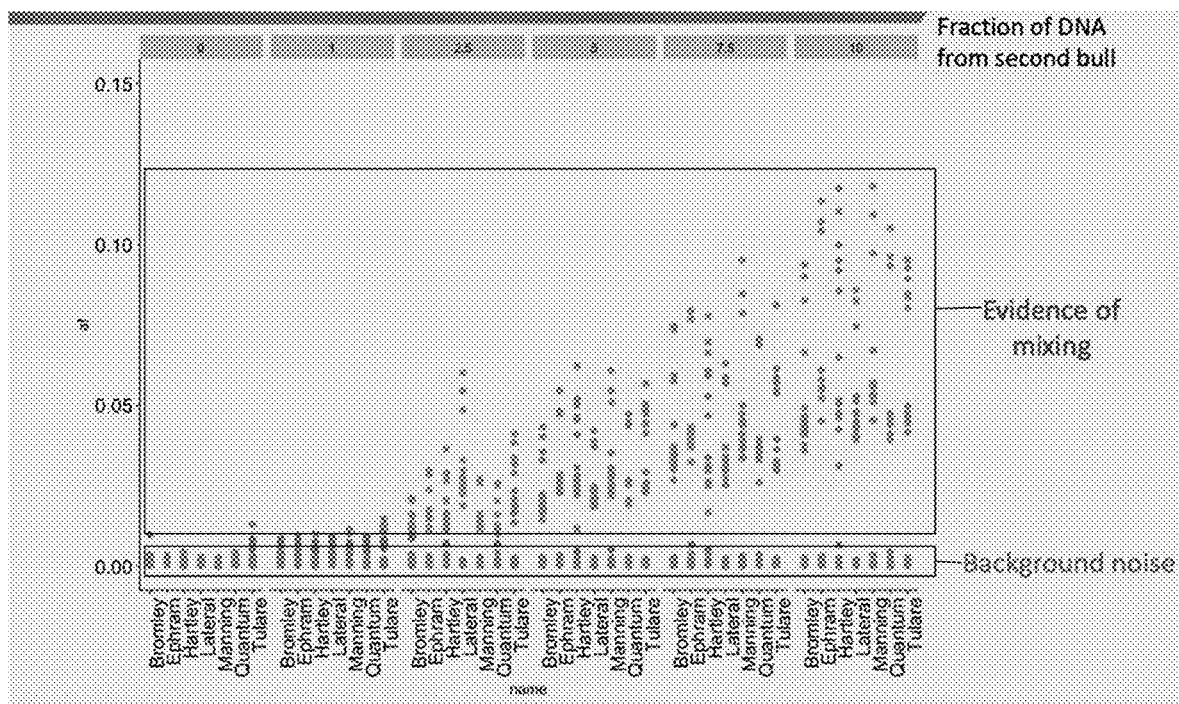
FIG. 1C shows the evidence of mixing compared to the background noise for various samples with particular fractions of contamination from a second bull.

FIG. 1A shows a series of deliberate mixtures illustrating the results for mixed or contaminated samples. Chart 102 shows a mixture ratio of 0. Chart 104 shows a mixture ratio of 1. Chart 106 shows a mixture ratio of 2.5. Chart 108 shows a mixture ratio of 5. Chart 110 shows a mixture ratio of 7.5. Chart 112 shows a mixture ratio of 10. Chart 114 shows a mixture ratio of 25. Chart 116 shows a mixture ratio of 50. In FIG. 1B, charts 120, 122, 124, 126, 128, 130, 132, and 134 shows the frequency of the second allele for a SNP expected to be homozygous at mixing ratios of 0, 1, 2.5, 2, 5, 7.5, and 10 for respective individuals Bromley, Ephram, Lateral, Quantum, Chamber, Hartley, Manning, and Tulare. FIG. 1C shows the evidence of mixing compared to the background noise for various samples with particular fractions of contamination from a second bull.

FIG. 2 shows an example of second allele frequencies for particular SNPs expected to be homozygous. In the exemplary chart in FIG. 2, the SNPs at chromosomes 2, 4, and 10 have second allele frequencies occurring at or greater than 30%, and the chromosomes 2, 3, 5, 8, 18, and 21 have second allele frequencies occurring above 0% but below 30%. This serves as a fingerprint for identifying the contaminating bull. For example, bull 29HO17718 is the only bull in the group with that particular genotype.

FIG. 3A, FIG. 3B, and FIG. 4 show schematic representations of the methods and systems and workflows of the present invention. Note that samples that are non-100% matches (or labeled as mixed or possibly mixed) may be subject to retesting before being destroyed.

Example 1

The following is a non-limiting example of the present invention. It is to be understood that said example is not intended to limit the present invention in any way. Equivalents or substitutes are within the scope of the present invention.

First, DNA extraction is performed using standard methods. A multiplex PCR is then performed using Qiagen Multiplex PCR Master Mix (Cat no: 206145) and 48 combined primer pairs. The product is then bead cleaned and verified for amplification on a gel. A second PCR is run to add the Illumina adapter sequences and barcodes. The samples are then pooled and sequenced on a next-generation sequencer (NGS) such as an Illumina sequencer using 1×75 bp reads. The samples are demultiplexed and binned by barcode by bcl2fastq. The fastqs are aligned to the UMD3.1 genome using BWA MEM. Allele frequencies (AF) for each SNP are calculated by counting the number of reads that contain each allele on a 0-0.5 scale, where the smaller allele is used in the numerator. Genotypes (GT) are called on a 0,1,2 scale where 0 is homozygous reference and 2 is homozygous alternate. 1 is heterozygous. If the AF is greater than or equal to 0.2 the GT is 1 (heterozygous). If the AF is <0.2 and the observed allele is reference the GT is 0, otherwise it is GT is 2. Once the genotypes are called, the identity of the sample can be checked by comparing the observed genotype with the genotypes in the database. If the sample does not match the genotypes in the database with less than 4 mismatches, then the Council of Dairy Cattle Breeding database (CDCB) is scanned for perfect matches. If a hit with >95% match is found the top hit is reported and the sample is labeled a Full swap. To detect contamination, SNPs that are expected to be homozygous are first selected. If a contamination occurs, these SNPs are expected to have an AF>0.02. By checking for multiple SNPs for these unexpected AF it can be determined if a sample has contamination or not. Using the top 3 SNPs, contamination level can be estimated. FIG. 3 shows a schematic of a workflow 300 related to the methods of the present invention. The present invention is not limited to the workflow 300 in FIG. 3.

With reference to the exemplary workflow 300 provided in FIG. 3B, step 302 provides for the extraction of DNA for a genetic sample. In step 304, a multiplex PCR is performed on 48 SNPs for the sample. In step 306, Illumina adapters are added to the genetic sample via PCR. In step 308, the sample is sequenced on a NGS such as an Illumina sequencer using, for example, 1×75 bp reads. In step 310, the reads from step 308 are aligned to the genome. In step 312, the number of reads supporting each allele are counted and the genotypes for the genetic sample are called. In step 314, sample swaps are identified by comparing the results of step 312, the called genotypes, to known genotypes, such as by comparing the called genotypes to reference sequences in a sequence library or database. In step 316, samples mixtures or contaminations are identified by identifying allele ratios and a mixture level is determined. In step 318, a sample status is identified based on at least the comparison in step 314 and identification in step 316, the sample status being, for example, one of clean (e.g., no contamination, mislabeling, or misidentification issues), mixture (e.g., contamination issues), or full swap (e.g., mislabeling or misidentification issues).

Example 2

The following is a non-limiting example of the present invention. It is to be understood that said example is not intended to limit the present invention in any way. Equivalents or substitutes are within the scope of the present invention.

The following example describes an overview of particular embodiments of the methods and systems of the present invention.

DNA is extracted from collected sperm cells that have undergone processing and packaging into straws. The process below describes analyzing the DNA against known/reference DNA of the bull to help ensure that the DNA in the straw is the DNA of the bull printed on the straw. Likely contaminators are the analysis system's (algorithm's) best guess at a contaminator with the options being all bulls processed within a single run (e.g., in certain embodiments, if the true contaminator is not present in the sequencing run, it may not be identified). Note also that the sequencing run can comprise DNA from a variety of sources and may include conventional and sexed DNA. In certain embodiments, a full run is 96 DNA samples×6 plates. However, the present invention is not limited to these parameters.

DNA received from the production labs is amplified. The amplification process amplifies a set of SNPs, e.g., 48-49 SNPs, including known regions of variance. A unique profile of SNPs is known for bulls. The genotype for each parent animal may also be in possession. This provides a library of animal genotypes including a profile for each animal comprising the SNPs, e.g., 48-49 SNPs.

How the DNA reads (e.g., determine what the reads are) at each of the SNP locations is examined. Each of the DNA reads are compared to the library. First, there is an attempt to identify a 100% match. If a 100% match is identified, then the process may finish. If no 100% match can be identified, the system will try and identify combinations of known profiles in the library. The system can identify if the sample comprises, for example, Animal #1 plus something else (contamination from another sample). It may be determined that the sample is not what it was thought to be (e.g., an "alternative" or a sample swap or mislabeling), or it may be determined that the sample comprises some contaminant.

The estimation of a non-100% match may be based on, for example, a subset of 10-20 SNPs of the total target SNPs. The system can identify an approximate percentage mixture, e.g., +/−5%. In certain embodiments, the system can identify a mix and what the sample is mixed with. However, in certain embodiments, the system may identify a mix, but not necessarily what the sample is mixed with (e.g., it may not always be possible to identify the contaminator), e.g., if another individual is not available for comparison.

The sequencing data, e.g., NGS data, may be routed through to an internal database (e.g., an analysis system, e.g., application) from the sequencers. Data may be provided as an output in the app user interfaces. The data from the app may be exported as an output file. The output file may include all batches run and their standings. In some embodiments, the identity for each batch run is indicated in the output file and may include several columns or categories of additional information. For example, one category of information may be identity, wherein a "Pass" is when the identity is found and confirmed. Other categories of information may include: Purity; Genomics, wherein the information is related to whether or not the test sample is a mixture; Quantity, wherein the information is related to whether or not there was enough sample to run and analyze; Times, wherein the information is related to the number of times that animal's samples have been run (e.g., 32 of 32, which would mean that the animal's samples have been run 32 times and come back the correct each time; 155 of 167, which would mean that the animal's samples have been run 155 times but 12 times the sample came back mixed, etc.), etc. FIG. 5 shows a hypothetical example of the output file, wherein samples EX1-EX3 are flagged as potential mixes, wherein samples EX4-EX7 are shown to be matches. Samples EX1-EX3 are reviewed to determine the source of error. Samples EX4-EX7 pass all tests and are released for use.

As previously discussed, the thresholds for quantity and purity may be modified. Thus, the output data such as that in FIG. 5 is a function of the predetermined thresholds.

Manual reviews of items identified as mixed may be performed when: there is no genomic data to compare against, the sample is 7% mixed. In some embodiments, two straws are retested. If the same percentage of contamination and same number of contaminating SNPs are detected, the sample fails.

In certain embodiments, full swaps (e.g., mislabeling of a sample) may become a pass if appropriately identified to be another bull.

Example 3

The following is a non-limiting example of the present invention. It is to be understood that said example is not intended to limit the present invention in any way. Equivalents or substitutes are within the scope of the present invention.

The following example describes an overview of the analysis system, e.g., application used for analysis and quality control. FIG. 4 shows a schematic view of the analysis system integrated with the sequencer and internal database, as well as quality control.

A user (e.g., technician) can log into the user interface of the analysis system (e.g., application). The user may use the system for reviewing certain samples, e.g., confirming genetic matches, determining whether or not a sample may have been a mixture, etc.

The analysis system may feature visual indicators that alert a user to a particular issue (e.g., possible mixture, lack of quantity, not a 100% match to expected reference animal, etc.).

A batch is called a run, and a run consists of several plates, each plate comprising several samples.

Failures may occur where there is not enough sequence information or not enough reads to make a determination about the purity or identity.

In certain instances, a technician will go through a list of mixtures. The results may be shown as a plot wherein the X axis is the loci (SNPs). If the sample is mixed, there will be a distinctive pattern (e.g., see FIG. 1A, FIG. 1B). In certain embodiments, SNPs that match consensus/known DNA of the individual bull may be labeled in a first design (e.g., whole, filled in circles; a first color, etc.); SNPs that do not match consensus/known DNA of the individual bull may be labeled in a second design (e.g., whole, empty circles; a second color; etc.); and SNPs that have no consensus/known DNA to compare to may be labeled in a third design (e.g., labeled with X; a third color; etc.). A clean sample will have not dots that are indicators of contaminations or unexpected results (e.g., red dots).

The analysis system, e.g., the plots, allows for determining when there has been an out of threshold mixture in the process, if the sample is potentially contaminated. The system helps visualize when the output of the process has gone wrong.

The analysis system may allow for a comparison to past samples. For example, a user may select recent runs to review. The system helps easily view outliers. The system may help identify mixtures (e.g., low level mixtures) occurring over a certain number of samples (straws), e.g., over 20 straws, 30, 40, 50, etc., which could indicate a problem in the process.

The system may allow for setting the thresholds for passing (e.g., identified as a genetic match), failing (e.g., identified as a mismatch or a possible mixture), and mixture (e.g., what is considered a mixture). In certain embodiments, the thresholds may be visualized by lines in the graphs or plots.

As previously discussed, the system may provide a means of indicating an issue such as contamination or too little DNA. In certain embodiments, the read counts and read percentile are indicators of how well the sequencing has performed, and the analysis system may provide confidence levels for the data.

As a non-limiting example, the system may use red dots on the plots as indicators of contaminations or unexpected results. FIG. 1C shows an example wherein the dots indicated as "evidence of mixing" are indicators of potential problems that require evaluation. For example, a heterozygous fail may be one wherein one of the mixes was not quite what was expected for the SNP; other fails may be shown as dots (e.g., red dots) in the middle of the plot or interface. In certain embodiments, the application allows for comparing the layered sample data to see areas of consistent failures for individual animals.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A method of processing extracted DNA from a sperm sample having or suspected of having contamination said method comprising:
   a. subjecting the extracted DNA from the sperm sample to nucleotide amplification using a pool of SNP primer pairs, each SNP primer pair flanking a unique locus that contains a single target SNP defining a first allele and a second allele, the nucleotide amplification produces amplicons for each SNP primer pair generating a pool of SNP amplicons;
   b. subjecting the pool of SNP amplicons to multiplex sequencing to generate a nucleotide sequence for each amplicon in the pool;
   c. calculating a frequency of the first allele and the second allele for each SNP;
   d. analyzing frequencies of the first alleles and second alleles for each SNP in a subset of the target SNPs obtained from step (c.) with respect to a reference sequence to identify a sample status of the sperm sample, wherein the subset of the target SNPs is a group of SNPs expected to be homozygous, the sample status is identified to be either contaminated or non-contaminated, wherein:
      i) if the frequencies of the first alleles and second alleles for each SNP in the subset of the target SNPs are an exact match to corresponding SNPs in the reference sequence, then the sample status of the sperm sample is identified as non-contaminated; or
      ii) if the frequencies of the first alleles and second alleles for each SNP in the subset of the target SNPs are not exact matches to corresponding SNPs in the reference sequence, and if a frequency of non-matching allele for a particular SNP is above a predetermined non-matching threshold, the predetermined non-matching threshold being less than 5%, then the particular SNP is a contaminating SNP, wherein:
         A) if the number of contaminating SNPs is above a predetermined contaminating SNP threshold, then the sample status of the sperm sample is identified as contaminated; or
         B) if the number of contaminating SNPs is below a predetermined contaminating SNP threshold, then the sample status of the sperm sample is identified as non-contaminated;
      and
   e. performing an action on the sperm sample based on its sample status, wherein said action is selected from the following:
      i. using the sperm sample if the sample status is non-contaminated; or
      ii. discarding or reprocessing the sperm sample if the sample status is contaminated.

2. The method of claim 1, wherein the method allows for confirming identity of the sperm sample, determining purity of the sperm sample, detecting contamination in the sperm sample, and determining an origin of contamination in the sperm sample.

3. The method of claim 1, wherein the sperm sample has been subjected to a machine for determining the sex of animal and comprises live and dead sperm.

4. The method of claim 1, wherein the sperm sample is a mislabeled sample or a sample swap.

5. The method of claim 1, wherein multiplex sequencing is next-generation sequencing (NGS).

6. The method of claim 1, wherein the nucleotide amplification step comprises PCR amplification with the pool of SNP primer pairs and a subsequent PCR step to add adapter sequences and barcodes for next-generation sequencing.

7. The method of claim 1 further comprising using an analysis system for calculating the frequency of the first allele and the second allele for each SNP and comparing the frequencies of the first allele and second alleles for each SNP to that of the reference sequence or the group of reference sequences in a sequence library.

8. The method of claim 1, wherein if the frequencies of the first alleles and second alleles for each SNP in the subset of the target SNPs are an exact match to those same SNPs in the reference sequence, then the sperm sample is at least 98% pure.

9. The method of claim 1, wherein if the sperm sample has 1 or more contaminating SNPs, the sperm sample is identified as contaminated.

10. The method of claim 1, wherein the method provides a rate of contamination by one or more genetically distinct individuals.

11. The method of claim 1, wherein the pool of SNP primer pairs comprises at least 48 primer sets.

12. The method of claim 1, wherein the frequencies of non-matching alleles for the SNPs in the subset of the target SNPs is calculated as a number from 0-1.

13. The method of claim 1, wherein if the sperm sample has at least 5 of SNPs in the subset of the target SNPs that are contaminating SNPs, then the sperm sample is considered a contaminated sample.

14. The method of claim 1, wherein if at least 5%, at least 10%, or at least 1% of SNPs in the subset of the target SNPs are contaminating SNPs, then the sperm sample is considered a contaminated sample.

15. The method of claim 1, wherein the method further comprises identifying an origin of the contamination.

16. The method of claim 15, wherein determining origin of contamination in the sperm sample comprises comparing the sperm sample to one or more alternative reference sequences, wherein the contamination may be traced to the one or more alternative reference sequences.

17. The method of claim 16, wherein the alternative reference sequence is one from a sequence library, a public database, or an industry database.

18. The method of claim 1, wherein allele frequencies for each SNP are calculated by counting, on a 0-0.5 scale, a number of reads that contain each allele, wherein a smaller allele is used as a numerator; wherein genotypes are called on a 0,1,2 scale, wherein 0 is homozygous according to the reference sequence and 2 is homozygous but the allele is opposite the reference sequence, and 1 is heterozygous; wherein if the allele frequency is greater than or equal to 0.2 then the genotype is 1, if the allele frequency is <0.2 and the allele is the same as the reference sequence then the genotype is 0, and if the allele is opposite the reference sequence then the genotype is 2.

19. The method of claim 1, wherein the method further comprises determining if the sperm sample has sufficient genetic material for analysis.

* * * * *

SEQUENCE LISTING

```
<160> NUMBER OF SEQ ID NOS: 96

<210> SEQ ID NO 1
<211> LENGTH: 25
<212> TYPE: DNA
<213> ORGANISM: Bos taurus

<400> SEQUENCE: 1
tttccttctg tagatgttaa ctggt                                        25

<210> SEQ ID NO 2
<211> LENGTH: 23
<212> TYPE: DNA
<213> ORGANISM: Bos taurus

<400> SEQUENCE: 2
acggacaata aactgtaaat ttc                                          23

<210> SEQ ID NO 3
<211> LENGTH: 26
<212> TYPE: DNA
<213> ORGANISM: Bos taurus

<400> SEQUENCE: 3
cacttgtatg tatttcagaa gttttc                                       26

<210> SEQ ID NO 4
<211> LENGTH: 20
<212> TYPE: DNA
<213> ORGANISM: Bos taurus

<400> SEQUENCE: 4
aggatcacaa acaatgccct                                              20

<210> SEQ ID NO 5
<211> LENGTH: 26
<212> TYPE: DNA
<213> ORGANISM: Bos taurus
```

```
<400> SEQUENCE: 5
tctgaaggaa ttgaaaatgt ctacca                                          26

<210> SEQ ID NO 6
<211> LENGTH: 24
<212> TYPE: DNA
<213> ORGANISM: Bos taurus

<400> SEQUENCE: 6
acttctacaa ttagcgatta actg                                            24

<210> SEQ ID NO 7
<211> LENGTH: 24
<212> TYPE: DNA
<213> ORGANISM: Bos taurus

<400> SEQUENCE: 7
tcagaggaga atgtctagtt taga                                            24

<210> SEQ ID NO 8
<211> LENGTH: 18
<212> TYPE: DNA
<213> ORGANISM: Bos taurus

<400> SEQUENCE: 8
tcagtgtgac ggagctgc                                                   18

<210> SEQ ID NO 9
<211> LENGTH: 20
<212> TYPE: DNA
<213> ORGANISM: Bos taurus

<400> SEQUENCE: 9
tcatgagaaa tcagcccaca                                                 20

<210> SEQ ID NO 10
<211> LENGTH: 24
<212> TYPE: DNA
<213> ORGANISM: Bos taurus

<400> SEQUENCE: 10
acctgctgtg taatgtattt aaac                                            24

<210> SEQ ID NO 11
<211> LENGTH: 24
<212> TYPE: DNA
<213> ORGANISM: Bos taurus

<400> SEQUENCE: 11
aggtttaagg gaatatttgc acct                                            24

<210> SEQ ID NO 12
<211> LENGTH: 24
<212> TYPE: DNA
<213> ORGANISM: Bos taurus

<400> SEQUENCE: 12
tttgaataac tgtacaggga attc                                            24

<210> SEQ ID NO 13
<211> LENGTH: 25
<212> TYPE: DNA
<213> ORGANISM: Bos taurus
```

```
<400> SEQUENCE: 13
gcttaaagtt ctaaaccaat caaca                                          25

<210> SEQ ID NO 14
<211> LENGTH: 25
<212> TYPE: DNA
<213> ORGANISM: Bos taurus

<400> SEQUENCE: 14
agctcttcta aaacaagtaa agcca                                          25

<210> SEQ ID NO 15
<211> LENGTH: 22
<212> TYPE: DNA
<213> ORGANISM: Bos taurus

<400> SEQUENCE: 15
ccaagaacca ctgtgatagg ag                                             22

<210> SEQ ID NO 16
<211> LENGTH: 22
<212> TYPE: DNA
<213> ORGANISM: Bos taurus

<400> SEQUENCE: 16
taagaaaaga gggaacaaga ct                                             22

<210> SEQ ID NO 17
<211> LENGTH: 21
<212> TYPE: DNA
<213> ORGANISM: Bos taurus

<400> SEQUENCE: 17
atgtggcttc ctgtattccc t                                              21

<210> SEQ ID NO 18
<211> LENGTH: 26
<212> TYPE: DNA
<213> ORGANISM: Bos taurus

<400> SEQUENCE: 18
gttcagcaaa taatttatag agaacc                                         26

<210> SEQ ID NO 19
<211> LENGTH: 20
<212> TYPE: DNA
<213> ORGANISM: Bos taurus

<400> SEQUENCE: 19
ctggcccaaa ctcatcacac                                                20

<210> SEQ ID NO 20
<211> LENGTH: 21
<212> TYPE: DNA
<213> ORGANISM: Bos taurus

<400> SEQUENCE: 20
acaaaccaac caccaaacag a                                              21

<210> SEQ ID NO 21
<211> LENGTH: 20
<212> TYPE: DNA
```

<213> ORGANISM: Bos taurus

<400> SEQUENCE: 21
tgagtttcag agagggccag                                                    20

<210> SEQ ID NO 22
<211> LENGTH: 20
<212> TYPE: DNA
<213> ORGANISM: Bos taurus

<400> SEQUENCE: 22
gccacttgat gccataggtc                                                    20

<210> SEQ ID NO 23
<211> LENGTH: 20
<212> TYPE: DNA
<213> ORGANISM: Bos taurus

<400> SEQUENCE: 23
agaaagccat acccagggag                                                    20

<210> SEQ ID NO 24
<211> LENGTH: 21
<212> TYPE: DNA
<213> ORGANISM: Bos taurus

<400> SEQUENCE: 24
agacaacagt gaagttcagg c                                                  21

<210> SEQ ID NO 25
<211> LENGTH: 20
<212> TYPE: DNA
<213> ORGANISM: Bos taurus

<400> SEQUENCE: 25
cccatgtatg tgtagctggc                                                    20

<210> SEQ ID NO 26
<211> LENGTH: 21
<212> TYPE: DNA
<213> ORGANISM: Bos taurus

<400> SEQUENCE: 26
ctgaggaaga cagggagaag g                                                  21

<210> SEQ ID NO 27
<211> LENGTH: 24
<212> TYPE: DNA
<213> ORGANISM: Bos taurus

<400> SEQUENCE: 27
acataagtac atatctactg gcct                                               24

<210> SEQ ID NO 28
<211> LENGTH: 22
<212> TYPE: DNA
<213> ORGANISM: Bos taurus

<400> SEQUENCE: 28
tgagaaccac ttaagatagg gt                                                 22

<210> SEQ ID NO 29
<211> LENGTH: 26

<212> TYPE: DNA
<213> ORGANISM: Bos taurus

<400> SEQUENCE: 29
tactaattgt atatcttgct gctcag 26

<210> SEQ ID NO 30
<211> LENGTH: 19
<212> TYPE: DNA
<213> ORGANISM: Bos taurus

<400> SEQUENCE: 30
ctgccttccc tcctcagtc 19

<210> SEQ ID NO 31
<211> LENGTH: 22
<212> TYPE: DNA
<213> ORGANISM: Bos taurus

<400> SEQUENCE: 31
aggtattatg agttgtgtgg gt 22

<210> SEQ ID NO 32
<211> LENGTH: 24
<212> TYPE: DNA
<213> ORGANISM: Bos taurus

<400> SEQUENCE: 32
acatcctctt acctaatctg agct 24

<210> SEQ ID NO 33
<211> LENGTH: 21
<212> TYPE: DNA
<213> ORGANISM: Bos taurus

<400> SEQUENCE: 33 ggaaaccta tgagccagag t 21

<210> SEQ ID NO 34
<211> LENGTH: 18
<212> TYPE: DNA
<213> ORGANISM: Bos taurus

<400> SEQUENCE: 34
tccctcagcc cctttcag 18

<210> SEQ ID NO 35
<211> LENGTH: 20
<212> TYPE: DNA
<213> ORGANISM: Bos taurus

<400> SEQUENCE: 35
gggagtggag agtggattgg 20

<210> SEQ ID NO 36
<211> LENGTH: 20
<212> TYPE: DNA
<213> ORGANISM: Bos taurus

<400> SEQUENCE: 36
tgcccctttt gtacagatgg 20

<210> SEQ ID NO 37

```
<211> LENGTH: 20
<212> TYPE: DNA
<213> ORGANISM: Bos taurus

<400> SEQUENCE: 37
attctcttga cttgcaggcg                                           20

<210> SEQ ID NO 38
<211> LENGTH: 25
<212> TYPE: DNA
<213> ORGANISM: Bos taurus

<400> SEQUENCE: 38
gtcaataact caataaaagc actga                                     25

<210> SEQ ID NO 39
<211> LENGTH: 19
<212> TYPE: DNA
<213> ORGANISM: Bos taurus

<400> SEQUENCE: 39
tgggttcttg ggtccagag                                            19

<210> SEQ ID NO 40
<211> LENGTH: 20
<212> TYPE: DNA
<213> ORGANISM: Bos taurus

<400> SEQUENCE: 40
aggtcccagt ctcctccttc                                           20

<210> SEQ ID NO 41
<211> LENGTH: 20
<212> TYPE: DNA
<213> ORGANISM: Bos taurus

<400> SEQUENCE: 41
gactgcctgg atctgagagg                                           20

<210> SEQ ID NO 42
<211> LENGTH: 20
<212> TYPE: DNA
<213> ORGANISM: Bos taurus

<400> SEQUENCE: 42
caacgggaca cttgcctttc                                           20

<210> SEQ ID NO 43
<211> LENGTH: 20
<212> TYPE: DNA
<213> ORGANISM: Bos taurus

<400> SEQUENCE: 43
atgtctagcc ctcactccca                                           20

<210> SEQ ID NO 44
<211> LENGTH: 21
<212> TYPE: DNA
<213> ORGANISM: Bos taurus

<400> SEQUENCE: 44
cgtgatcaag gcagaactac a                                         21
```

```
<210> SEQ ID NO 45
<211> LENGTH: 20
<212> TYPE: DNA
<213> ORGANISM: Bos taurus

<400> SEQUENCE: 45
aagagcagct ggtttcctat                                              20

<210> SEQ ID NO 46
<211> LENGTH: 22
<212> TYPE: DNA
<213> ORGANISM: Bos taurus

<400> SEQUENCE: 46
aggggagaag atatgcagac ag                                           22

<210> SEQ ID NO 47
<211> LENGTH: 20
<212> TYPE: DNA
<213> ORGANISM: Bos taurus

<400> SEQUENCE: 47
gtcctcatca gcctcgtcat                                              20

<210> SEQ ID NO 48
<211> LENGTH: 20
<212> TYPE: DNA
<213> ORGANISM: Bos taurus

<400> SEQUENCE: 48
atatccaccc tgcaaaccca                                              20

<210> SEQ ID NO 49
<211> LENGTH: 20
<212> TYPE: DNA
<213> ORGANISM: Bos taurus

<400> SEQUENCE: 49
agtgctatca tgtgccttga                                              20

<210> SEQ ID NO 50
<211> LENGTH: 21
<212> TYPE: DNA
<213> ORGANISM: Bos taurus

<400> SEQUENCE: 50
acacagactt taaagcagcc t                                            21

<210> SEQ ID NO 51
<211> LENGTH: 18
<212> TYPE: DNA
<213> ORGANISM: Bos taurus

<400> SEQUENCE: 51
gaggggaggg gagggttg                                                18

<210> SEQ ID NO 52
<211> LENGTH: 20
<212> TYPE: DNA
<213> ORGANISM: Bos taurus

<400> SEQUENCE: 52
gagaattcag gggcccttct                                              20
```

```
<210> SEQ ID NO 53
<211> LENGTH: 24
<212> TYPE: DNA
<213> ORGANISM: Bos taurus

<400> SEQUENCE: 53
ggataatctt tagcaatcag aggc                                          24

<210> SEQ ID NO 54
<211> LENGTH: 20
<212> TYPE: DNA
<213> ORGANISM: Bos taurus

<400> SEQUENCE: 54
tctccccgct tgtaacagtt                                               20

<210> SEQ ID NO 55
<211> LENGTH: 19
<212> TYPE: DNA
<213> ORGANISM: Bos taurus

<400> SEQUENCE: 55
aaaacttgct gccagggaa                                                19

<210> SEQ ID NO 56
<211> LENGTH: 18
<212> TYPE: DNA
<213> ORGANISM: Bos taurus

<400> SEQUENCE: 56
cacgaggcac atatcagt                                                 18

<210> SEQ ID NO 57
<211> LENGTH: 20
<212> TYPE: DNA
<213> ORGANISM: Bos taurus

<400> SEQUENCE: 57
cctgttacct gggcttcatg                                               20

<210> SEQ ID NO 58
<211> LENGTH: 22
<212> TYPE: DNA
<213> ORGANISM: Bos taurus

<400> SEQUENCE: 58
acgactcggc atagatgatt tg                                            22

<210> SEQ ID NO 59
<211> LENGTH: 22
<212> TYPE: DNA
<213> ORGANISM: Bos taurus

<400> SEQUENCE: 59
cctctctttc aggccaaaat cc                                            22

<210> SEQ ID NO 60
<211> LENGTH: 26
<212> TYPE: DNA
<213> ORGANISM: Bos taurus

<400> SEQUENCE: 60
ctattctatt ttcctcaagt atctgc                                        26
```

<210> SEQ ID NO 61
<211> LENGTH: 21
<212> TYPE: DNA
<213> ORGANISM: Bos taurus

<400> SEQUENCE: 61
attcagattg atggtccagc a                                              21

<210> SEQ ID NO 62
<211> LENGTH: 21
<212> TYPE: DNA
<213> ORGANISM: Bos taurus

<400> SEQUENCE: 62
agtggtgatc tcaaagaggc t                                              21

<210> SEQ ID NO 63
<211> LENGTH: 22
<212> TYPE: DNA
<213> ORGANISM: Bos taurus

<400> SEQUENCE: 63
taactgcatc gttaaactgg ct                                             22

<210> SEQ ID NO 64
<211> LENGTH: 19
<212> TYPE: DNA
<213> ORGANISM: Bos taurus

<400> SEQUENCE: 64
cttctggagc tcacccacc                                                 19

<210> SEQ ID NO 65
<211> LENGTH: 19
<212> TYPE: DNA
<213> ORGANISM: Bos taurus

<400> SEQUENCE: 65
cactcagacg tccccaacc                                                 19

<210> SEQ ID NO 66
<211> LENGTH: 20
<212> TYPE: DNA
<213> ORGANISM: Bos taurus

<400> SEQUENCE: 66
gggttcggca agattcaagt                                                20

<210> SEQ ID NO 67
<211> LENGTH: 18
<212> TYPE: DNA
<213> ORGANISM: Bos taurus

<400> SEQUENCE: 67
gaggctgcca ggtgtcac                                                  18

<210> SEQ ID NO 68
<211> LENGTH: 20
<212> TYPE: DNA
<213> ORGANISM: Bos taurus

<400> SEQUENCE: 68
tgaaaaggta gcccaggtgt                                              20

<210> SEQ ID NO 69
<211> LENGTH: 19
<212> TYPE: DNA
<213> ORGANISM: Bos taurus

<400> SEQUENCE: 69
gttttgcctt ccacccacc                                               19

<210> SEQ ID NO 70
<211> LENGTH: 23
<212> TYPE: DNA
<213> ORGANISM: Bos taurus

<400> SEQUENCE: 70
tctccaaagc aaacaagtta gtg                                          23

<210> SEQ ID NO 71
<211> LENGTH: 17
<212> TYPE: DNA
<213> ORGANISM: Bos taurus

<400> SEQUENCE: 71
ccaacctgtt cagcaca                                                 17

<210> SEQ ID NO 72
<211> LENGTH: 20
<212> TYPE: DNA
<213> ORGANISM: Bos taurus

<400> SEQUENCE: 72
agatcttccc caacagtact                                              20

<210> SEQ ID NO 73
<211> LENGTH: 20
<212> TYPE: DNA
<213> ORGANISM: Bos taurus

<400> SEQUENCE: 73
ggaagtccct tgtgctcatc                                              20

<210> SEQ ID NO 74
<211> LENGTH: 20
<212> TYPE: DNA
<213> ORGANISM: Bos taurus

<400> SEQUENCE: 74
aagtagacca cgcccctttc                                              20

<210> SEQ ID NO 75
<211> LENGTH: 23
<212> TYPE: DNA
<213> ORGANISM: Bos taurus

<400> SEQUENCE: 75
aaagtaataa ggcttgcctt cca                                          23

<210> SEQ ID NO 76
<211> LENGTH: 23
<212> TYPE: DNA
<213> ORGANISM: Bos taurus

<400> SEQUENCE: 76

```
tgagaaatat tgactacacg ccc                                              23

<210> SEQ ID NO 77
<211> LENGTH: 21
<212> TYPE: DNA
<213> ORGANISM: Bos taurus

<400> SEQUENCE: 77
aaggggctca taagataaag c                                                21

<210> SEQ ID NO 78
<211> LENGTH: 21
<212> TYPE: DNA
<213> ORGANISM: Bos taurus

<400> SEQUENCE: 78
ccagagatgg ggcatagaac t                                                21

<210> SEQ ID NO 79
<211> LENGTH: 17
<212> TYPE: DNA
<213> ORGANISM: Bos taurus

<400> SEQUENCE: 79
gtgcctggct ctgtaca                                                     17

<210> SEQ ID NO 80
<211> LENGTH: 16
<212> TYPE: DNA
<213> ORGANISM: Bos taurus

<400> SEQUENCE: 80
tgccgacctc acgtgg                                                      16

<210> SEQ ID NO 81
<211> LENGTH: 20
<212> TYPE: DNA
<213> ORGANISM: Bos taurus

<400> SEQUENCE: 81
gtccatccat gttgctgcaa                                                  20

<210> SEQ ID NO 82
<211> LENGTH: 18
<212> TYPE: DNA
<213> ORGANISM: Bos taurus

<400> SEQUENCE: 82
tactggccaa gaacacct                                                    18

<210> SEQ ID NO 83
<211> LENGTH: 23
<212> TYPE: DNA
<213> ORGANISM: Bos taurus

<400> SEQUENCE: 83
attatgtttt aatgcactgc tgt                                              23

<210> SEQ ID NO 84
<211> LENGTH: 20
<212> TYPE: DNA
<213> ORGANISM: Bos taurus
```

```
<400> SEQUENCE: 84
ttggcattgg gaaagggaaa                                              20

<210> SEQ ID NO 85
<211> LENGTH: 20
<212> TYPE: DNA
<213> ORGANISM: Bos taurus

<400> SEQUENCE: 85
tgtgggttgt agtagcagca                                              20

<210> SEQ ID NO 86
<211> LENGTH: 20
<212> TYPE: DNA
<213> ORGANISM: Bos taurus

<400> SEQUENCE: 86
acccagtcac attcagagct                                              20

<210> SEQ ID NO 87
<211> LENGTH: 22
<212> TYPE: DNA
<213> ORGANISM: Bos taurus

<400> SEQUENCE: 87
actaaaatac aaatgcaggc ac                                           22

<210> SEQ ID NO 88
<211> LENGTH: 26
<212> TYPE: DNA
<213> ORGANISM: Bos taurus

<400> SEQUENCE: 88
ggtaccctgt attctttcaa atgagt                                       26

<210> SEQ ID NO 89
<211> LENGTH: 22
<212> TYPE: DNA
<213> ORGANISM: Bos taurus

<400> SEQUENCE: 89
tgctgcagat tctttacttg ct                                           22

<210> SEQ ID NO 90
<211> LENGTH: 21
<212> TYPE: DNA
<213> ORGANISM: Bos taurus

<400> SEQUENCE: 90
tctctagccc atgtcatgac t                                            21

<210> SEQ ID NO 91
<211> LENGTH: 25
<212> TYPE: DNA
<213> ORGANISM: Bos taurus

<400> SEQUENCE: 91
tcttttcatc cttaccatag ctagg                                        25

<210> SEQ ID NO 92
<211> LENGTH: 20
<212> TYPE: DNA
<213> ORGANISM: Bos taurus
```

```
<400> SEQUENCE: 92
ttgcagatgt gatcaaggct                                              20

<210> SEQ ID NO 93
<211> LENGTH: 24
<212> TYPE: DNA
<213> ORGANISM: Bos taurus

<400> SEQUENCE: 93
aggattgtat ttaaggttgt ctga                                         24

<210> SEQ ID NO 94
<211> LENGTH: 20
<212> TYPE: DNA
<213> ORGANISM: Bos taurus

<400> SEQUENCE: 94
tgatgcccac aataccaggt                                              20

<210> SEQ ID NO 95
<211> LENGTH: 22
<212> TYPE: DNA
<213> ORGANISM: Bos taurus

<400> SEQUENCE: 95
caggcagatg gttttaacac ac                                           22

<210> SEQ ID NO 96
<211> LENGTH: 26
<212> TYPE: DNA
<213> ORGANISM: Bos taurus

<400> SEQUENCE: 96
agataatata gactgtagtg ctgggt                                       26
```